(12) United States Patent
Zhang

(10) Patent No.: US 11,025,434 B2
(45) Date of Patent: *Jun. 1, 2021

(54) RING SIGNATURE-BASED ANONYMOUS TRANSACTION

(71) Applicant: Advanced New Technologies Co., Ltd., George Town (KY)

(72) Inventor: Wenbin Zhang, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 17/034,964

(22) Filed: Sep. 28, 2020

(65) Prior Publication Data

US 2021/0014071 A1 Jan. 14, 2021

Related U.S. Application Data

(63) Continuation of application No. 16/815,615, filed on Mar. 11, 2020, now Pat. No. 10,790,990, which is a
(Continued)

(30) Foreign Application Priority Data

Jun. 26, 2019 (CN) .......................... 201910563802.6

(51) Int. Cl.
*H04L 9/32* (2006.01)
*H04L 9/30* (2006.01)
(Continued)

(52) U.S. Cl.
CPC ........ *H04L 9/3247* (2013.01); *G06F 16/2365* (2019.01); *G06F 16/28* (2019.01);
(Continued)

(58) Field of Classification Search
CPC ... H04L 9/3247; H04L 9/3236; H04L 9/3066; H04L 63/0421; H04L 2209/38;
(Continued)

(56) References Cited

U.S. PATENT DOCUMENTS 10,277,400 B1\* 4/2019 Griffin ...................... H04L 9/30
10,790,990 B2 9/2020 Zhang
(Continued)

FOREIGN PATENT DOCUMENTS

CN 107358424 11/2017
CN 104782077 12/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Aravind K Moorthy
(74) *Attorney, Agent, or Firm* — Fish & Richardson P.C.

(57) ABSTRACT

This disclosure relates to anonymous transactions based on ring signatures. In one aspect, a method includes receiving a remittance transaction. The remittance transaction is generated by a client device of a remitter by assembling unspent assets in an account corresponding to the remitter and masked assets in an account corresponding to a masked participant. Key images are obtained from a linkable spontaneous anonymous group (LSAG) signature of the remittance transaction. Values of the key-images are based on a private key, a public key, and unspent assets of the remitter. The LSAG signature is verified. The LSAG signature is generated by the client device of the remitter based on the private key and the public key of the remitter, and a second public key of the masked participant. The remittance trans-
(Continued)

action is executed when a transaction execution condition is met.

23 Claims, 11 Drawing Sheets

Related U.S. Application Data continuation of application No. PCT/CN2020/070947, filed on Jan. 8, 2020.

(51) Int. Cl.
 *H04L 29/06* (2006.01)
 *G06F 16/28* (2019.01)
 *G06Q 20/38* (2012.01)
 *G06F 16/23* (2019.01)

(52) U.S. Cl.
 CPC ......... *G06Q 20/383* (2013.01); *H04L 9/3066* (2013.01); *H04L 9/3236* (2013.01); *H04L 63/0421* (2013.01); *G06Q 2220/10* (2013.01)

(58) Field of Classification Search
 CPC ... H04L 9/3239; H04L 9/3255; G06Q 20/383; G06Q 2220/10; G06Q 20/065; G06Q 20/3829; G06F 16/28; G06F 16/2365
 See application file for complete search history.

(56) References Cited

U.S. PATENT DOCUMENTS

| | | | |
|---|---|---|---|
| 2005/0097336 A1 | 5/2005 | Canard et al. | |
| 2005/0169461 A1 | 8/2005 | Canard et al. | |
| 2006/0155985 A1 | 7/2006 | Canard et al. | |
| 2009/0323972 A1 | 12/2009 | Kohno et al. | |
| 2012/0284518 A1 | 11/2012 | Walker et al. | |
| 2016/0080156 A1 | 3/2016 | Kaliski, Jr. | |
| 2016/0085955 A1 | 3/2016 | Lerner | |
| 2016/0283941 A1* | 9/2016 | Andrade | H04L 9/3247 |
| 2016/0330034 A1 | 11/2016 | Back et al. | |
| 2017/0005804 A1* | 1/2017 | Zinder | H04L 63/123 |
| 2017/0046698 A1 | 2/2017 | Haldenby et al. | |
| 2017/0091726 A1 | 3/2017 | Morgan et al. | |
| 2017/0230189 A1* | 8/2017 | Toll | H04L 9/3247 |
| 2017/0236121 A1 | 8/2017 | Lyons et al. | |
| 2017/0337534 A1* | 11/2017 | Goeringer | G06Q 20/06 |
| 2017/0357966 A1 | 12/2017 | Chandrasekhar et al. | |
| 2017/0364552 A1 | 12/2017 | Pattanaik et al. | |
| 2018/0025435 A1 | 1/2018 | Karame et al. | |
| 2018/0114012 A1 | 4/2018 | Sood et al. | |
| 2018/0189878 A1* | 7/2018 | Uhr | G06Q 40/04 |
| 2018/0204192 A1* | 7/2018 | Whaley | G06Q 20/0658 |
| 2018/0205559 A1 | 7/2018 | Busser | |
| 2018/0234254 A1 | 8/2018 | Camenisch et al. | |
| 2018/0240107 A1 | 8/2018 | Andrade | |
| 2018/0285866 A1* | 10/2018 | Bederov | G06Q 20/065 |
| 2018/0293547 A1 | 10/2018 | Randhawa | |
| 2018/0331832 A1* | 11/2018 | Pulsifer | H04L 9/0637 |
| 2018/0331835 A1* | 11/2018 | Jackson | H04L 9/3247 |
| 2018/0343114 A1* | 11/2018 | Ben-Ari | H04L 9/06 |
| 2019/0025805 A1 | 1/2019 | Cella et al. | |
| 2019/0028276 A1* | 1/2019 | Pierce | G06Q 20/389 |
| 2019/0035018 A1 | 1/2019 | Nolan et al. | |
| 2019/0043048 A1* | 2/2019 | Wright | G06Q 20/10 |
| 2019/0052454 A1* | 2/2019 | Wright | H04L 9/0861 |
| 2019/0052461 A1* | 2/2019 | Kreder, III | H04L 9/3247 |
| 2019/0132295 A1* | 5/2019 | Lenz | G06F 21/64 |
| 2019/0156301 A1* | 5/2019 | Bentov | G06Q 20/389 |
| 2019/0164153 A1* | 5/2019 | Agrawal | G06Q 20/065 |
| 2019/0172026 A1* | 6/2019 | Vessenes | H04L 9/3247 |
| 2019/0188701 A1* | 6/2019 | Parsons | H04L 9/3239 |
| 2019/0197532 A1* | 6/2019 | Jayachandran | G06Q 20/3823 |
| 2019/0220324 A1* | 7/2019 | Carver | G06N 7/08 |
| 2019/0220859 A1* | 7/2019 | Weight | G06Q 20/381 |
| 2019/0236602 A1* | 8/2019 | Song | G06Q 20/385 |
| 2019/0236881 A1* | 8/2019 | Ivanov | H04L 9/088 |
| 2019/0244195 A1* | 8/2019 | Ma | G06Q 20/3825 |
| 2019/0244207 A1 | 8/2019 | Samuel | |
| 2019/0253256 A1* | 8/2019 | Saab | H04L 9/0637 |
| 2019/0253259 A1* | 8/2019 | Qiu | H04L 9/0637 |
| 2019/0266601 A1* | 8/2019 | Allen | G06F 21/645 |
| 2019/0287175 A1* | 9/2019 | Hill | G06Q 40/04 |
| 2019/0296915 A1* | 9/2019 | Lancashire | G06Q 20/3825 |
| 2019/0312734 A1* | 10/2019 | Wentz | H04L 9/3247 |
| 2019/0319798 A1* | 10/2019 | Chalkias | G06N 10/00 |
| 2019/0327078 A1* | 10/2019 | Zhang | H04L 9/3239 |
| 2019/0327218 A1 | 10/2019 | Altenhofen et al. | |
| 2019/0363882 A1* | 11/2019 | Levy | H04L 9/3297 |
| 2019/0378119 A1* | 12/2019 | Hyuga | G06Q 20/065 |
| 2019/0378134 A1* | 12/2019 | Asari | G06Q 20/223 |
| 2019/0379531 A1* | 12/2019 | Aleksander | G06F 16/152 |
| 2019/0379642 A1* | 12/2019 | Simons | H04L 63/0414 |
| 2020/0005292 A1* | 1/2020 | Mao | H04L 9/3247 |
| 2020/0036712 A1 | 1/2020 | Soundararajan et al. | |
| 2020/0052879 A1 | 2/2020 | Gaur et al. | |
| 2020/0052903 A1 | 2/2020 | Lam et al. | |
| 2020/0058022 A1* | 2/2020 | Ma | H04L 9/008 |
| 2020/0074458 A1* | 3/2020 | Govindarajan | G06Q 20/065 |
| 2020/0074463 A1 | 3/2020 | Noble | |
| 2020/0099528 A1* | 3/2020 | Chan | G06F 16/2379 |
| 2020/0118130 A1 | 4/2020 | Brown | |
| 2020/0127813 A1 | 4/2020 | Miller et al. | |
| 2020/0134586 A1* | 4/2020 | Wu | G06Q 20/105 |
| 2020/0162264 A1* | 5/2020 | Zamani | H04L 9/3297 |
| 2020/0167741 A1* | 5/2020 | Gamaroff | G06Q 20/065 |
| 2020/0186355 A1 | 6/2020 | Davies | |
| 2020/0202345 A1* | 6/2020 | Zhang | G06Q 20/3672 |
| 2020/0213085 A1* | 7/2020 | Fletcher | H04L 9/3255 |
| 2020/0213130 A1* | 7/2020 | Zhang | H04L 9/3066 |
| 2020/0213134 A1* | 7/2020 | Zhang | G06Q 20/3829 |
| 2020/0219099 A1* | 7/2020 | Mohassel | G06Q 20/3827 |
| 2020/0242593 A1* | 7/2020 | Deshpande | H04L 9/3297 |
| 2020/0273025 A1* | 8/2020 | Sharma | H04L 9/0637 |
| 2020/0322132 A1* | 10/2020 | Covaci | H04L 9/3247 |
| 2020/0349616 A1* | 11/2020 | El Kaafarani | H04L 9/3255 |
| 2020/0351083 A1* | 11/2020 | Bartolucci | H04L 9/085 |
| 2020/0358619 A1* | 11/2020 | Ding | H04L 9/0852 |
| 2020/0382309 A1* | 12/2020 | Jayachandran | H04L 9/3247 |
| 2020/0389292 A1* | 12/2020 | Bartolucci | H04L 9/3239 |

FOREIGN PATENT DOCUMENTS

| | | |
|---|---|---|
| CN | 107453865 | 12/2017 |
| CN | 107784580 | 3/2018 |
| CN | 107911216 | 4/2018 |
| CN | 109377215 | 2/2019 |
| CN | 109544129 | 3/2019 |
| CN | 109743171 | 5/2019 |
| CN | 110335042 | 10/2019 |
| EP | 3396608 | 10/2018 |
| WO | WO 2018224943 | 12/2018 |
| WO | WO 2019021105 | 1/2019 |
| WO | WO 2019072302 | 4/2019 |
| WO | WO 2019116249 | 6/2019 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2020/070947, dated Apr. 9, 2020, 15 pages (with partial English translation).

* cited by examiner

RING SIGNATURE-BASED ANONYMOUS TRANSACTION

CROSS-REFERENCE TO RELATED APPLICATIONS

This application is a continuation of U.S. application Ser. No. 16/815,615, filed on Mar. 11, 2020, which is a continuation of PCT Application No. PCT/CN2020/070947, filed on Jan. 8, 2020, which claims priority to Chinese Patent Application No. 201910563802.6, filed on Jun. 26, 2019, and each application is hereby incorporated by reference in its entirety.

TECHNICAL FIELD

One or more implementations of the present specification relate to the field of blockchain technologies, and in particular, to anonymous transactions based on ring signatures.

BACKGROUND

Blockchain technology (also referred to as distributed ledger technology) is a decentralized, transparent, tamper-proofing, and trustworthy distributed database technology, and is applicable to many application scenarios that require high data reliability.

SUMMARY

In view of this, one or more implementations of the present specification provide anonymous transaction methods and devices based on ring signatures.

To achieve the previous objective, one or more implementations of the present specification provide the following technical solutions:

According to a first aspect of one or more implementations of the present specification, an anonymous transaction method based on a ring signature is provided, including: assembling a remittance transaction M based on unspent assets $ID\_j\_1$–$ID\_j\_m$ in an account corresponding to a remitter and masked assets $ID\_i\_1$–$ID\_i\_m$ in an account corresponding to a masked participant i, where the unspent assets $ID\_j\_1$–$ID\_j\_m$ and the masked assets $ID\_i\_1$–$ID\_i\_m$ are respectively recorded in a blockchain ledger as asset commitments corresponding to corresponding asset amounts; generating a linkable spontaneous anonymous group (LSAG) signature for the remittance transaction M based on a private key $x\_j$ and a public key $P\_j$ that are held by the remitter, and a public key $P\_i$ held by the masked participant i, where the LSAG signature includes key-images $I\_1$–$I\_m$, and values of the key-images $I\_1$–$I\_m$ are related to the private key $x\_j$, the public key $P\_j$, and asset identifiers $ID\_j\_1$–$ID\_j\_m$ of the remitter; and submitting a signed remittance transaction M to a blockchain network, where after the transaction is completed, the key-images $I\_1$–$I\_m$ are added to a historical key-image set, and the unspent assets $ID\_j\_1$–$ID\_j\_m$ are kept in the blockchain ledger as assets held by the remitter.

According to a second aspect of one or more implementations of the present specification, an anonymous transaction method based on a ring signature is provided, including: receiving a remittance transaction M, where the remittance transaction M is generated by a remitter by assembling unspent assets $ID\_j\_1$–$ID\_j\_m$ in an account corresponding to the remitter and masked assets $ID\_i\_1$–$ID\_i\_m$ in an account corresponding to a masked participant i; and after the transaction is completed, the assets $ID\_j\_1$–$ID\_j\_m$ are kept in a blockchain ledger as assets held by the remitter; obtaining key-images $I\_1$–$I\_m$ included in an LSAG signature of the remittance transaction M, where values of the key-images $I\_1$–$I\_m$ are related to a private key $x\_j$, a public key $P\_j$, and asset identifiers $ID\_j\_1$–$ID\_j\_m$ of the remitter; verifying the LSAG signature, where the LSAG signature is generated by the remitter based on the private key $x\_j$ and the public key $P\_j$ that are held by the remitter, and a public key $P\_i$ held by the masked participant i; and executing the remittance transaction M when a transaction execution condition is met, where the transaction execution condition includes: the key-images $I\_1$–$I\_m$ do not belong to a historical key-image set, and the LSAG signature is verified, where the key-images $I\_1$–$I\_m$ are added to the historical key-image set after the transaction is completed.

According to a third aspect of one or more implementations of the present specification, an anonymous transaction device based on a ring signature is provided, including: a transaction assembly unit, configured to assemble a remittance transaction M based on unspent assets $ID\_j\_1$–$ID\_j\_m$ in an account corresponding to a remitter and masked assets $ID\_i\_1$–$ID\_i\_m$ in an account corresponding to a masked participant i, where the unspent assets $ID\_j\_1$–$ID\_j\_m$ and the masked assets $ID\_i\_1$–$ID\_i\_m$ are respectively recorded in a blockchain ledger as asset commitments corresponding to corresponding asset amounts; a signature generation unit, configured to generate an LSAG signature for the remittance transaction M based on a private key $x\_j$ and a public key $P\_j$ that are held by the remitter, and a public key $P\_i$ held by the masked participant i, where the LSAG signature includes key-images $I\_1$–$I\_m$, and values of the key-images $I\_1$–$I\_m$ are related to the private key $x\_j$, the public key $P\_j$, and asset identifiers $ID\_j\_1$–$ID\_j\_m$ of the remitter; and a transaction submission unit, configured to submit a signed remittance transaction M to a blockchain network, where after the transaction is completed, the key-images $I\_1$–$I\_m$ are added to a historical key-image set, and the unspent assets $ID\_j\_1$–$ID\_j\_m$ are kept in the blockchain ledger as assets held by the remitter.

According to a fourth aspect of one or more implementations of the present specification, an anonymous transaction device based on a ring signature is provided, including: a transaction receiving unit, configured to receive a remittance transaction M, where the remittance transaction M is generated by a remitter by assembling unspent assets $ID\_j\_1$–$ID\_j\_m$ in an account corresponding to the remitter and masked assets $ID\_i\_1$–$ID\_i\_m$ in an account corresponding to a masked participant i; and after the transaction is completed, the assets $ID\_j\_1$–$ID\_j\_m$ are kept in a blockchain ledger as assets held by the remitter; an image acquisition unit, configured to obtain key-images $I\_1$–$I\_m$ included in an LSAG signature of the remittance transaction M, where values of the key-images $I\_1$–$I\_m$ are related to a private key $x\_j$, a public key $P\_j$, and asset identifiers $ID\_j\_1$–$ID\_j\_m$ of the remitter; a signature verification unit, configured to verify the LSAG signature, where the LSAG signature is generated by the remitter based on the private key $x\_j$ and the public key $P\_j$ that are held by the remitter, and a public key $P\_i$ held by the masked participant i; and a transaction execution unit, configured to execute the remittance transaction M when a transaction execution condition is met, where the transaction execution condition includes: the key-images $I\_1$–$I\_m$ do not belong to a historical key-image set, and the LSAG signature is verified, where the key-images $I\_1$–$I\_m$ are added to the historical key-image set after the transaction is completed.

According to a fifth aspect of one or more implementations of the present specification, an electronic device is provided, including: a processor; and a memory, configured to store instructions that can be executed by the processor; where the processor implements the method according to the first aspect by running the executable instructions.

According to a sixth aspect of one or more implementations of the present specification, a computer readable storage medium is provided, where computer instructions are stored on the computer readable storage medium, and the instructions are executed by a processor to implement the steps of the method according to the first aspect.

According to a seventh aspect of one or more implementations of the present specification, an electronic device is provided, including: a processor; and a memory, configured to store instructions that can be executed by the processor; where the processor implements the method according to the second aspect by running the executable instructions.

According to an eighth aspect of one or more implementations of the present specification, a computer readable storage medium is provided, where computer instructions are stored on the computer readable storage medium, and the instructions are executed by a processor to implement the steps of the method according to the second aspect.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent same or similar elements. Example implementations described in the following do not represent all implementations consistent with the present specification. On the contrary, the implementations are only examples of device and methods that are described in the appended claims in detail and consistent with some aspects of the present specification.

It is worthwhile to note that, in other implementations, steps of a corresponding method are not necessarily performed according to a sequence shown and described in the present specification. In some other implementations, the method can include more or less steps than those described in the present specification. In addition, a single step described in the present specification may be broken down into multiple steps in other implementations for description. However, the multiple steps described in the present specification may also be combined into a single step for description in other implementations.

Figure 1:
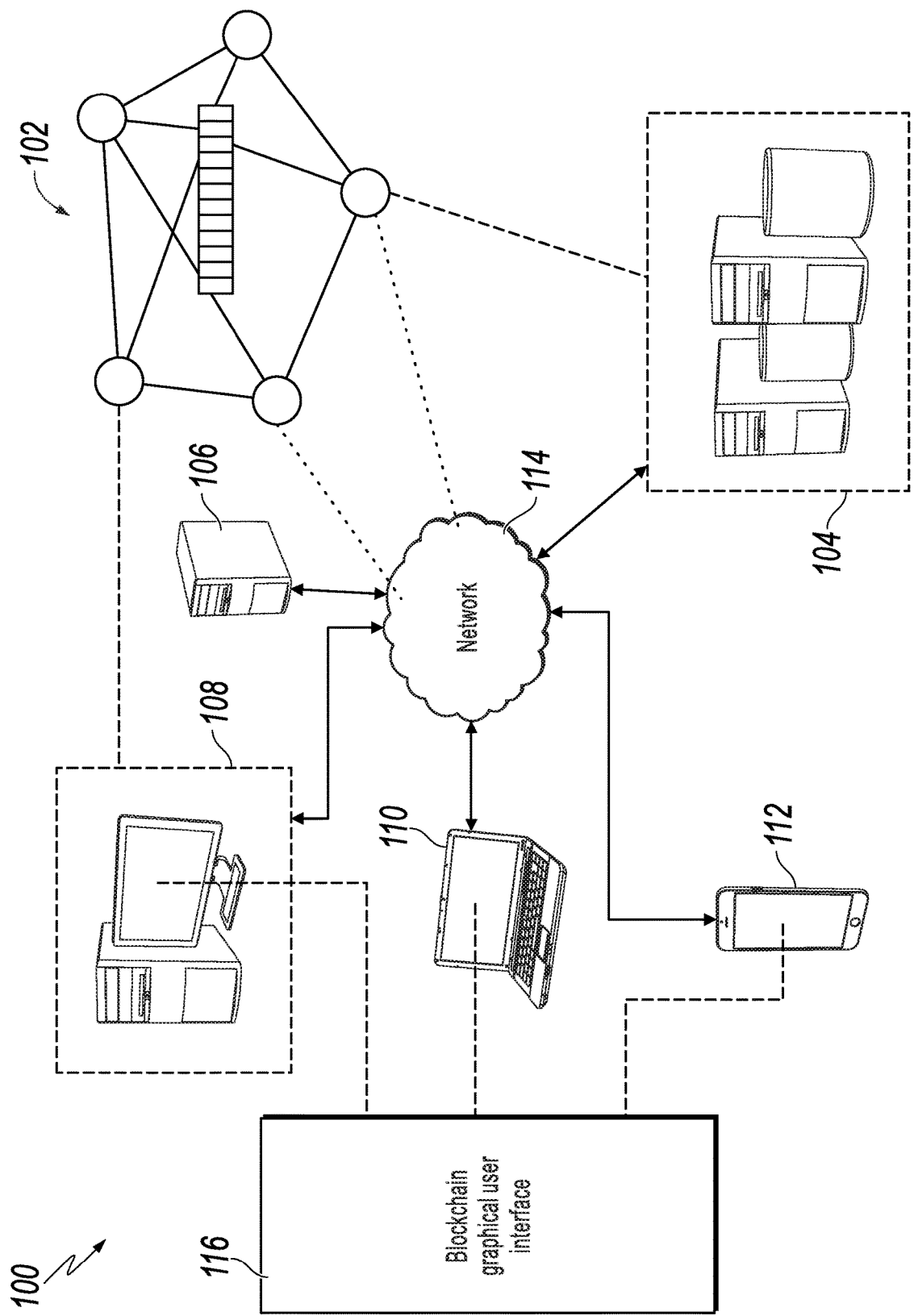
FIG. 1 is a schematic diagram illustrating an example environment, according to an example implementation.

FIG. 1 is a schematic diagram illustrating an example environment, according to an example implementation. As shown in FIG. 1, an example environment 100 allows entities to participate in a blockchain network 102. The blockchain network 102 can be of a public type, a private type, or a consortium type. The example environment 100 can include computing devices 104, 106, 108, 110, and 112 and a network 114. In an implementation, the network 114 can include a local area network (LAN), a wide area network (WAN), the Internet, or a combination thereof, and be connected to a website, user equipment (e.g., a computing device), and a backend system. In an implementation, the network 114 can be accessed through a wired or wireless connection.

In some cases, the computing devices 106 and 108 can be nodes (not shown) of a cloud computing system, or each of the computing devices 106 and 108 can be a separate cloud computing system, including multiple computers interconnected by a network and operating as a distributed processing system.

In an implementation, the computing devices 104 to 108 can run any suitable computing system to enable the computing devices to function as nodes in the blockchain network 102. For example, the computing devices 104 to 108 can include but are not limited to servers, desktop computers, notebook computers, tablet computers, computing devices, and smartphones. In an implementation, the computing devices 104 to 108 can belong to related entities and be configured to implement corresponding services. For example, the service can be used to manage transactions of one entity or between more entities.

In an implementation, the computing devices 104 to 108 separately store blockchain ledgers corresponding to the blockchain network 102. The computing device 104 can be (or include) a network server configured to provide a browser function, and the network server can provide visualization information related to the blockchain network 102 based on the network 114. In some cases, the computing device 104 need not participate in block verification, and instead monitors the blockchain network 102 to determine when other nodes (such as the computing devices 106 to 108) reach a consensus, and thereby generate a corresponding blockchain graphical user interface (GUI).

In an implementation, the computing device 104 can receive a request from a client device (such as the computing device 110 or the computing device 112) for a blockchain visual user interface. In some cases, a node of the blockchain network 102 can also be used as a client device, for example, a user of the computing device 108 can send the previous request to the computing device 104 by using a browser running on the computing device 108.

In response to the previous request, the computing device 104 can generate a blockchain visual user interface (such as a web page) based on the stored blockchain ledger, and send the generated blockchain visual user interface to the requested client device. If the blockchain network 102 is of a private type or a consortium type, the request for the blockchain visual user interface can include user authorization information. Before the blockchain visual user interface is generated and sent to the requested client device, the computing device 104 can verify the user authorization information, and after the verification succeeds, return the corresponding blockchain visual user interface.

The blockchain visual user interface can be displayed on the client device (for example, can be displayed on the user interface 116 shown in FIG. 1). When the blockchain ledger is updated, display content of the user interface 116 can also be updated accordingly. In addition, interaction between a user and the user interface 116 may result in a request for another user interface, such as displaying a block list, block details, a transaction list, transaction details, an account list, account details, a contract list, contract details, or a search result page generated by the user by searching in the blockchain network.

Figure 2:
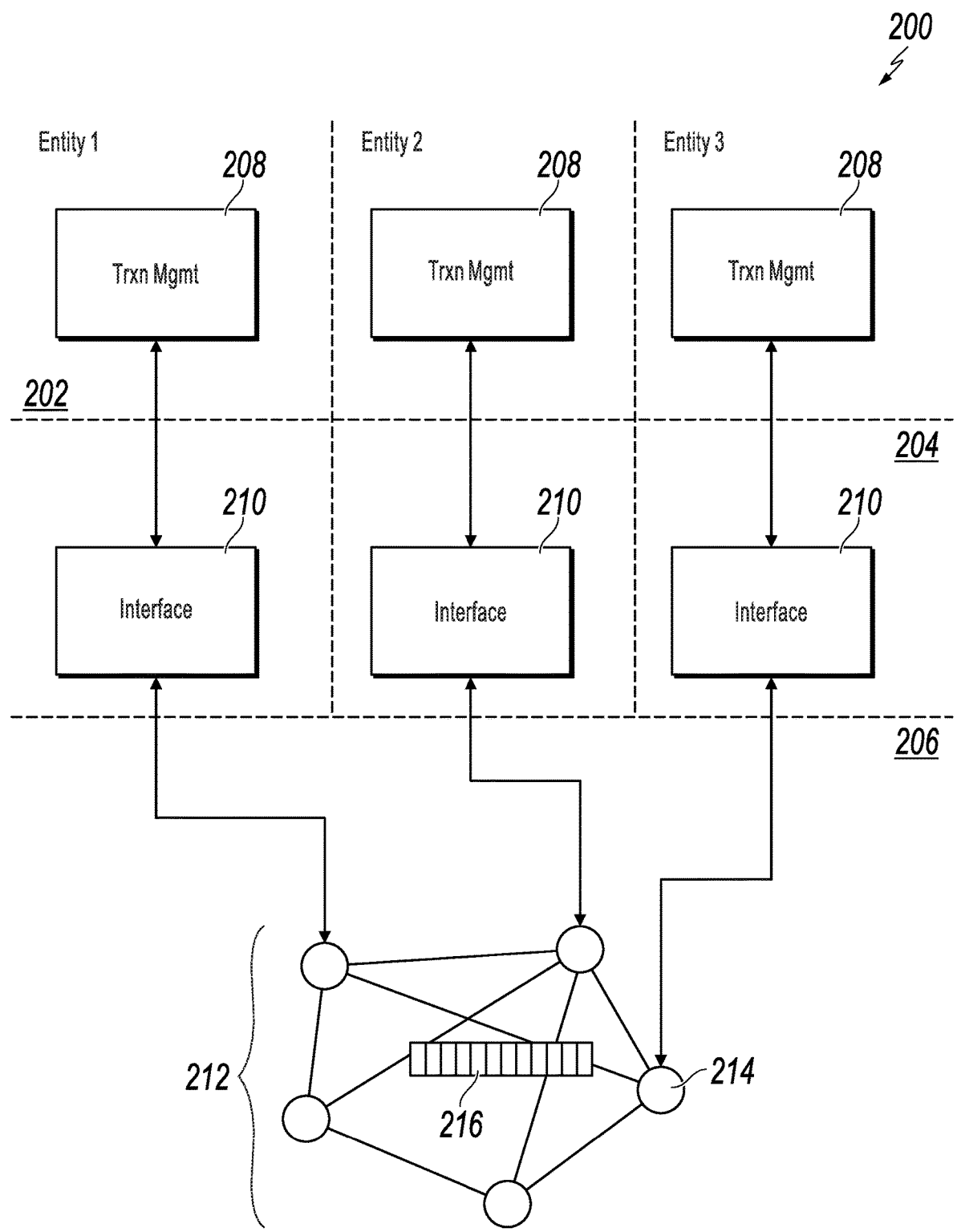
FIG. 2 is a schematic diagram illustrating a conceptual architecture, according to an example implementation.

FIG. 2 is a schematic diagram illustrating a conceptual architecture, according to an example implementation. As shown in FIG. 2, the conceptual architecture 200 includes an entity layer 202, a managed service layer 204, and a blockchain network layer 206. For example, the entity layer 202 can include three entities: entity 1, entity 2, and entity 3, each having its own transaction management system 208.

In an implementation, the managed service layer 204 can include an interface 210 corresponding to each transaction management system 208. For example, each transaction management system 208 communicates with a respective interface 210 over a network (e.g., the network 114 in FIG. 1) using a protocol (e.g., Hypertext Transfer Protocol Secure (HTTPS)). In some examples, each interface 210 can provide a communicative connection between a respective transaction management system 208 and the blockchain network layer 206. More specifically, the interface 210 can communicate with the blockchain network 212 of the blockchain network layer 206. In some examples, communication between the interface 210 and the blockchain network layer 206 can be implemented by using remote procedure calls (RPC). In some examples, the interface 210 can provide an API interface for accessing the blockchain network 212 to the transaction management system 208.

As described here, the blockchain network 212 is provided in the form of a peer-to-peer network including a plurality of nodes 214 that are respectively configured to persist blockchain ledgers 216 formed from blockchain data. FIG. 2 shows only one blockchain ledger 216, but multiple blockchain ledgers 216 or copies can exist in the blockchain network 212. For example, each node 214 can separately maintain one blockchain ledger 216 or copy.

It is worthwhile to note that the transaction described in the present specification refers to a piece of data that is created by a user by using a blockchain client and that needs to be finally published to a distributed database of the blockchain. Transactions in the blockchain include transactions in a narrow sense and transactions in a broad sense. A transaction in a narrow sense refers to a value transfer published by a user to the blockchain. For example, in a conventional Bitcoin blockchain network, a transaction can be a transfer initiated by a user in the blockchain. A transaction in a broad sense refers to service data that is published by a user to the blockchain and that has a service intention. For example, an operator can establish a consortium blockchain based on actual service requirements, and deploy some other types of online services (for example, a rental service, a vehicle scheduling service, an insurance claim service, a credit service, and a medical service) that are not related to value transfer in the consortium blockchain. In such consortium blockchain, a transaction can be a service message or a service request that is published by a user in the consortium blockchain and that has a service intention.

Blockchains can generally be classified into three types: public blockchains, private blockchains, and consortium blockchains. In addition, there are several types of combinations, such as private blockchain+consortium blockchain and consortium blockchain+public blockchain. The public blockchain has the highest degree of de-centralization. The public blockchain is represented by Bitcoin and Ethereum. Participants who join the public blockchain can read on-chain data records, participate in transactions, and compete for accounting rights of new blocks. Furthermore, each participant (i.e., node) can freely join and exit the network and perform related operations. On the contrary, a write right of the private blockchain network is controlled by a certain organization or institution, and a data reading right is specified by the organization. In short, the private blockchain can be a weak centralization system, and participating nodes are strictly limited and rare. This type of blockchain is more suitable for internal use within a specific organization. The consortium blockchain is a blockchain balanced between the public blockchain and the private blockchain, and can be "partially decentralized". Each node in the consortium blockchain usually has a corresponding entity institution or organization. Participants join the network through authorization and form interest-related consortiums to jointly maintain blockchain operation.

By using a distributed architecture used in a blockchain network and among the blocks, information can be permanently stored, without being tampered with, in a blockchain ledger uniformly maintained by all blockchain nodes. However, information privacy cannot be guaranteed due to full disclosure of the blockchain ledgers. For example, any user can query a blockchain ledger on any blockchain node to know information such as an asset held by a certain account and a transfer amount of a certain transaction. The information may be sensitive and need to be hidden.

For the purpose of privacy protection, a commitment-based anonymous transaction or confidential transaction solution is provided in the related technology. An asset amount held in each account, a transfer amount involved in the transaction, etc. can be generated as corresponding commitment amounts, and instead of plaintext asset amounts and transaction amounts, only the commitment amounts are recorded in the blockchain ledger. For example, when the Pedersen commitment mechanism is used, assume that an original amount is t, and a corresponding commitment amount can be $PC(t, r)=r \times G+t \times H$, where G and H are random base points of elliptic-curve signature, r is a random number, and a value of r is only held by an account owner, a transaction participant, etc., so an irrelevant person cannot derive the original amount t only based on the value of $PC(t, r)$. In addition, the commitment amounts also have a homomorphic characteristic, so the commitment amounts can be directly involved in calculation, for example, $PC(t1, r1)-PC(t2, r2)=PC(t1-t2, r1-r2)$. However, when verifying a transaction, a blockchain node cannot determine, based on the commitment amount, whether related conditions are met. For example, a transfer-in amount of the transaction is equal to a transfer-out amount etc. Therefore, related proof information is required to ensure successful completion of the transaction.

In addition, a signature is required when a user initiates a transaction in the blockchain network. For example, when user A wants to spend an asset held by user A in the blockchain, user A can initiate a blockchain transaction and sign the transaction by using a private key $x\_j$ held by user A. Correspondingly, the previous signature can be verified by using a public key $P\_j$ corresponding to the private key $x\_j$ held by user A. However, direct verification on the signature also reveals that user A is the signer of the corresponding signature, resulting in privacy disclosure of user A.

For the purpose of protecting the signer identity, a processing solution based on a ring signature is provided in the related technology. User A can hide the public key $P\_j$ held by user A in a set of public keys $(P\_1, \ldots, P\_n)$, where public keys $P\_1-P\_j-1$ and $P\_j+1-P\_n$ respectively belong to other users. Then, user A generates a signature by using the held private key $x\_j$ and the previous set of public keys $(P\_1, \ldots, P\_n)$, and a verifier can verify that the signature is generated by using a private key corresponding to a certain public key in the set of public keys $(P\_1, \ldots, P\_n)$, but cannot determine a specific public key. As such, the set of public keys $(P\_1, \ldots, P\_n)$ is used to hide the signer identity.

It can be understood that when the previous description uses a form of $(P\_1, \ldots, P\_n)$, although it appears to be a set of public keys that start from $P\_1$ and end at $P\_n$, the verifier actually cannot determine a sequence of the public keys, so the set of public keys is equivalent to a ring structure without head or tail for the verifier and therefore is referred to as a ring signature.

Although the ring signature solution can hide the signer identity, a problem of "double-spending" can occur when the ring signature solution is applied to transaction scenarios of the blockchain network. For example, the blockchain network can perform asset management by using an unspent transaction output (UTXO) model: A blockchain asset held by a user is recorded as an output of a corresponding transaction, one or more unspent transaction outputs are used as inputs of each transaction, and one or more outputs are correspondingly generated. Typically, UTXO is applied to Bitcoin and cryptocurrency derived from Bitcoin. When the ring signature solution is applied to a blockchain network based on the UTXO model, the same asset may be referenced separately by multiple transactions. However, because a signer identity is hidden by the ring signature solution, a verifier cannot figure out that the same asset is referenced repeatedly, which causes a "double-spending" problem.

Therefore, the related technology provides an improved solution to the ring signature solution, which is referred to as an LSAG signature, and can generate a key-image used to mark a signer but does not expose a corresponding public key used by the signer for signing in a set of ring signatures, so an identity of the signer can be hidden and the "double-spending" problem can be alleviated based on the key-image.

Monero is used as an example. Monero implements asset management by using the UTXO model. All assets in the model are transaction outputs of corresponding blockchain transactions, and all assets generated on the blockchain network are managed collectively. Each asset has a unique public-private key pair, and a user can spend a corresponding asset by using a held public-private key pair. For example, when a certain asset held by a signer (for example, a remitter in a remittance transaction) corresponds to a private key $x\_j$ and a public key $P\_j$, a corresponding key-image can be generated based on an equation $I=x\_j \times \text{Hash}(P\_j)$. Then, as long as the asset has been previously spent, a blockchain node records a key-image with the same value to identify a "double-spending" problem.

However, each asset has a unique public-private key pair, so when one transaction includes multiple assets, multiple corresponding public-private key pairs are required. For example, when a transaction includes m assets, a signer needs to maintain m public-private key pairs, which causes high maintenance costs of the public-private key pairs.

Therefore, the present specification provides a new technical solution, so the signer needs to maintain only one public-private key pair, to generate an LSAG signature for a transaction involving multiple assets, which can satisfy a requirement of a confidential transaction for proof information. This is described in the following with reference to implementations.

Figure 3:
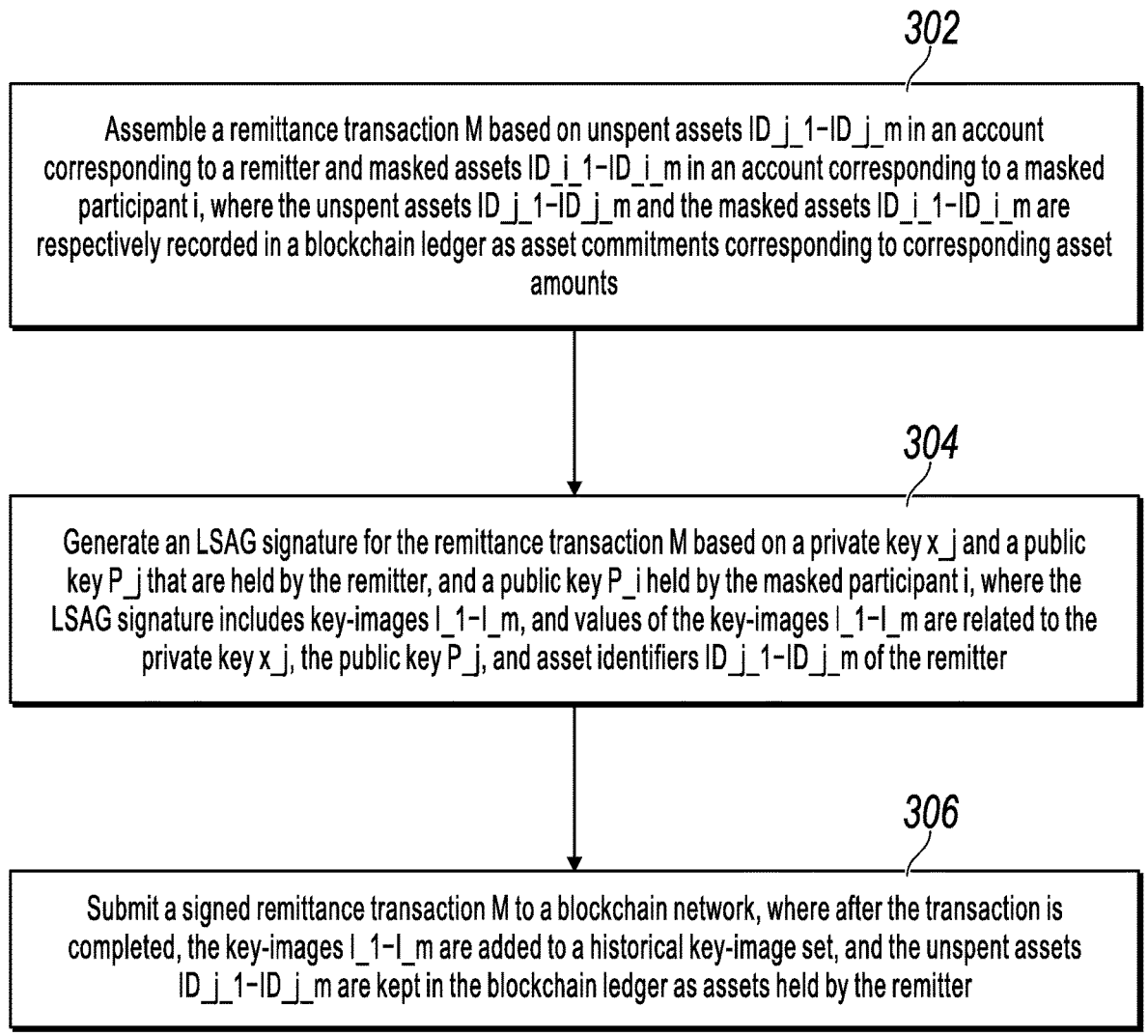
FIG. 3 is a flowchart illustrating an anonymous transaction method based on a ring signature, according to an example implementation.

FIG. 3 is a flowchart illustrating an anonymous transaction method based on a ring signature, according to an example implementation. As shown in FIG. 3, the method is applied to a client device and can include the following steps:

Step 302: Assemble a remittance transaction M based on unspent assets $ID\_j\_1-ID\_j\_m$ in an account corresponding to a remitter and masked assets $ID\_i\_1-ID\_i\_m$ in an account corresponding to a masked participant i, where the unspent assets $ID\_j\_1-ID\_j\_m$ and the masked assets $ID\_i\_1-ID\_i\_m$ are respectively recorded in a blockchain ledger as asset commitments corresponding to corresponding asset amounts.

As mentioned above, for the purpose of privacy protection of held assets, assets held by the remitter and any other user are recorded on the blockchain ledger as corresponding commitment amounts rather than plaintext asset amounts. The unspent assets $ID\_j\_1-ID\_j\_m$ are used as an example, and $ID\_j\_1-ID\_j\_m$ are asset identifiers to distinguish between different assets. Assume that asset amounts of the unspent assets $ID\_j\_1-ID\_j\_m$ are $t\_j\_1-t\_j\_m$, the asset amounts $t\_j\_1-t\_j\_m$ can be recorded on the blockchain ledger as corresponding asset commitments $PC(t\_j\_1, r\_j\_1)-PC(t\_j\_m, r\_j\_m)$, where $r\_j\_1-r\_j\_m$ are random numbers. Because of the existence of the random numbers $r\_j\_1-r\_j\_m$, the asset commitments $PC(t\_j\_1, r\_j\_1)-PC(t\_j\_m, r\_j\_m)$ generated by using the amounts $t\_j\_1-t\_j\_m$ are random. Except the remitter who knows the random numbers $t\_j\_1-t\_j\_m$, other users can see only the asset commitments $PC(t\_j\_1, r\_j\_1)-PC(t\_j\_m, r\_j\_m)$, and cannot deduce the corresponding asset amounts $t\_j\_1-t\_j\_m$ accordingly.

Similarly, for the masked assets $ID\_i\_1-ID\_i\_m$, $ID\_i\_1-ID\_i\_m$ are asset identifiers used to distinguish between different assets. Assume that asset amounts of the masked assets $ID\_i\_1-ID\_i\_m$ are $t\_i\_1-t\_i\_m$, the asset amounts $t\_i\_1-t\_i\_m$ can be recorded on the blockchain ledger as corresponding asset commitments $PC(t\_i\_1, r\_i\_1)-PC(t\_i\_m, r\_i\_m)$, where $r\_i\_1-r\_i\_m$ are random numbers. For example, a masked participant 1 holds masked assets $ID\_1\_1-ID\_1\_m$, and corresponding asset amounts are $t\_1\_1-t\_1\_m$. In this case, the blockchain ledger can record asset commitments $PC(t\_1\_1, 1\_1)-PC(t\_1\_m, r\_1\_m)$ corresponding to the asset amounts $t\_1\_1-t\_1\_m$, where $r\_1\_1-r\_1\_m$ are random numbers held only by the masked participant 1.

For example, an asset can be recorded and stored in a form similar to [ID, asset commitment] on the blockchain ledger. For example, the unspent assets $ID\_j\_1-ID\_j\_m$ can be recorded as $[ID\_j\_1, PC(t\_j\_1, r\_j\_1)][ID\_j\_m, PC(t\_j\_m, r\_j\_m)]$, and the masked assets $ID\_i\_1-ID\_i\_m$ corresponding to the masked participant i can be recorded as $[ID\_i\_1, PC\{i, 1\}][ID\_i\_m, PC\{i, m\}]$. Certainly, this is only an example, and the blockchain ledger can actually use other forms. For example, when multiple asset types exist, the assets can be recorded and stored in a form similar to [type, ID, asset commitment]. In the process of calculating asset amounts and executing transactions, impact of the asset type needs to be considered, for example, proportion conversion of asset amounts exists between assets of different types. In addition to directly recording the asset commitment, other information can be stored at the same time. The unspent asset $ID\_j\_m$ is used as an example, and can be recorded as $[ID\_j\_m, E(t\_j\_m, r\_j\_m)]$, where $E(t\_j\_m, r\_j\_m)=[PC(t\_j\_m, r\_j\_m), E(t\_j\_m), E(r\_j\_m)]$. $E(t\_j\_m)$ and $E(r\_j\_m)$ are homomorphic ciphers corresponding to an asset amount $t\_j\_m$ and a random number $r\_j\_m$, and can be obtained by encrypting the asset amount $t\_j\_m$ and the random number $r\_j\_m$ by using a homomorphic encryption key of the remitter (which is obtained by performing homomorphic encryption on the public key $P\_j$). For ease of understanding, the following is described by using an asset form of [ID, asset commitment] as an example.

Figure 4:
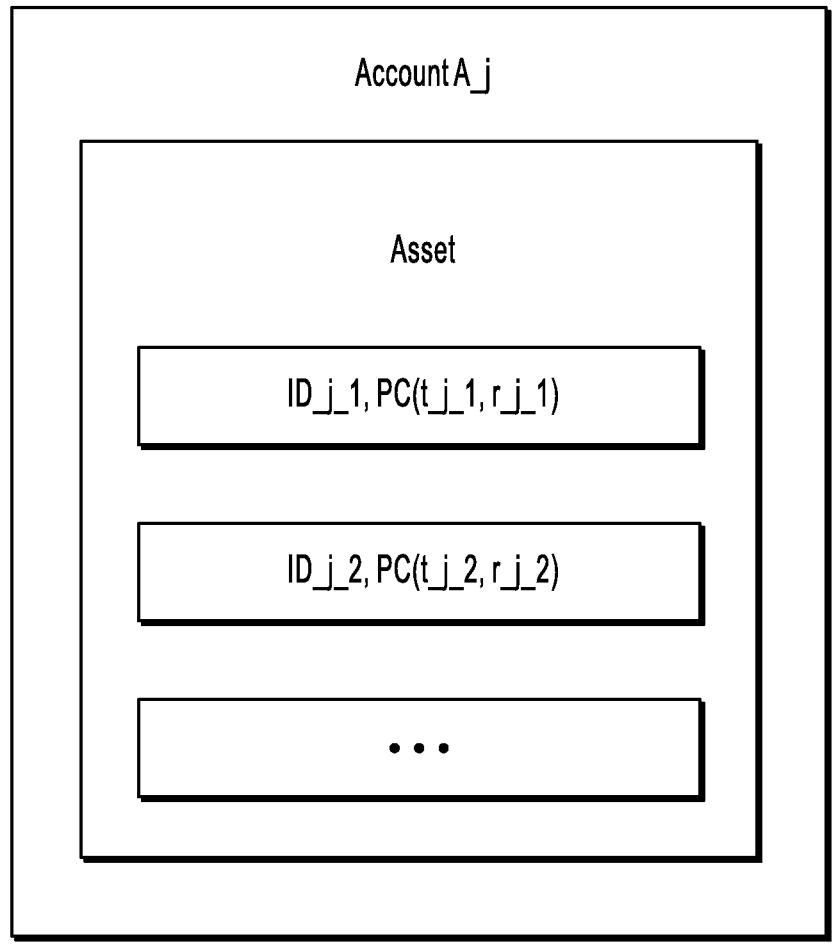
FIG. 4 is a schematic diagram illustrating an asset account model, according to an example implementation.

As described above, in the present specification, assets held by a user are managed in an "account" form. For example, an asset management model based on the "account" form, that is, an asset account model, can be implemented by using a UTXO model and an account model used in a related technology such as Ethereum. The asset account model can be used to generate a corresponding account for each user, and manage assets held by the user based on the account. For example, FIG. 4 is a schematic diagram illustrating an asset account model, according to an example implementation. FIG. 4 shows an account A j corresponding to a remitter. Unlike the previous account model, account A j does not directly record an account balance of the remitter, but records assets held by the remitter, such as assets $[ID\_j\_1, PC(t\_j\_1, r\_j\_1)]$ and $[ID\_j\_2, PC(t\_j\_2, r\_j\_2)]$. These assets can be clearly distinguished by using a one-to-one corresponding asset identifier. Each account has a unique account ID, which can be used to distinguish between different accounts. In addition, information of all accounts is recorded in the blockchain ledger, so assets contained in each account can be known by querying the blockchain ledger. Certainly, because an asset amount is recorded as a corresponding commitment amount in the blockchain ledger, the assets held by the user are not exposed, and user privacy can be protected.

There are several types of assets maintained in the asset account model. For example, similar to the UTXO model, an asset in the asset account model can be a transaction output of a corresponding historical transaction. For example, the unspent assets $ID\_j\_1-ID\_j\_m$ are transaction outputs formed by historical transactions that the remitter previously participates, and the remitter is a "remittee" role in these transactions. For another example, the masked assets $ID\_i\_1-ID\_i\_m$ are transaction outputs formed by historical transactions that the masked participant i previously participates, and the masked participant i is a "remittee" role in these transactions. For another example, similar to the account model, the asset account model can have a corresponding account balance, and actively divides at least a part of the account balance to form an asset with a certain asset amount. For example, the unspent assets $ID\_j\_1-ID\_j\_m$ are generated by dividing an account balance corresponding to the remitter, and the masked assets $ID\_i\_1-ID\_i\_m$ are generated by dividing an account balance corresponding to the masked participant i. When an asset is divided from an account balance, all asset balances can be divided into corresponding assets for management, or some account balances can be divided into assets and remaining account balances are still maintained in a form of value (this value is not shown in FIG. 4).

Of all assets in the corresponding account of the remitter, the unspent assets $ID\_j\_1-ID\_j\_m$ can be any assets held by the remitter. Certainly, when the unspent assets are actually selected, it is also necessary to refer to a remittance amount involved in the remittance transaction M and ensure that the sum of the unspent assets is not less than the remittance amount. The remittance amount is the amount that the remitter needs to transfer to each actual remittee. The amount is determined by the remitter in advance through negotiation with each actual remittee, or can be determined by the remitter itself.

From the point of view of transfer-in of the remittance transaction M, roles of the remitter and the masked participant are involved; and from the point of view of transfer-out, roles of the actual remittee and the transaction remittee are involved. Some of these roles may overlap.

For the remitter and the masked participant, the remittance transaction M is assembled based on the unspent assets $ID\_j\_1-ID\_j\_m$ in the account corresponding to the remitter and the masked assets $ID\_i\_1-ID\_i\_m$ in the account corresponding to the masked participant i, and an LSAG signature generated in the following is added, so the masked participant i can hide the identity of the remitter, and other users cannot determine which user in the "remitter and the masked participant i" spends assets. Here, the masked participant can include any user other than the remitter. For example, the masked participant can include an actual remittee of the remittance transaction M. For example, when the remitter is user A, and actual remittees are user B and user C, user B and user C are configured as masked participants, so user B and user C can perform identity hiding on user A. In addition, because user B and user C both belong to a "transaction remitter" and a "transaction remittee", stronger confusion is implemented. For another example, the masked participant can include another user that is different from the remitter and the actual remittees. For example, when the remitter is user A, and the actual remittees are user B and user C, an irrelevant user D can be configured as the masked participant, so as to perform identity hiding on user A. For another example, the masked participants can include both the actual remittees and another user. For example, when the remitter is user A, and the actual remittees are user B and user C, user B, user C, and user D can be configured as the masked participants, so as to perform identity hiding on user A.

For the actual remittee and the transaction remittee, in an implementation, the transaction remittee can be the actual remittee, and in this case, the sum of the asset amounts $t\_j\_1-t\_j\_m$ corresponding to the unspent assets $ID\_j\_1-ID\_j\_m$ is exactly equal to the sum of transfer amounts corresponding to all the actual remittees, that is, no change exists. In another implementation, in addition to the actual remittee, the transaction remittee can further include the remitter. In this case, there may be two cases: In one case, the remitter is not intentionally set as the transaction remittee, but because the sum of the asset amounts $t\_j\_1-t\_j\_m$ corresponding to the unspent assets $ID\_j\_1$–$ID\_j\_m$ is greater than the sum of the transfer amounts corresponding to all the actual remittees, there is a change that needs to be returned to the remitter, and the change (that is, the transfer amount corresponding to the remitter) is a difference between the sum of asset amounts $t\_j\_1$–$t\_j\_m$ and the sum of the transfer amounts. In the other case, although there is no change, the remitter can still be set as the transaction remittee, so the remitter can mask the actual remittee to some extent, and in this case, the transfer amount corresponding to the remitter can be set to 0, so as to alleviate affecting the original transfer operation. In yet another implementation, the transaction remittee can include a masked participant that is different from the actual remittee and the remitter, an identity of the actual remittee is hidden by the masked participant, and a transfer amount corresponding to the masked participant is 0. Certainly, in addition to the masked participant, the transaction remittee can include the remitter. When no change exists, transfer amounts corresponding to both the remitter and the masked participant are 0. When a change exists, the transfer amount corresponding to the remitter is a change amount, and the transfer amount corresponding to the masked participant is 0.

Based on actual situations, the identity of the remitter can be hidden only by using the masked participant, and the identity of the actual remittee can be further hidden. In an implementation, participants in the remittance transaction M can include the remitter, the actual remittee, and the masked participant different from the remitter and the actual remittee. These users constitute a total of n participants, and the n participants are all involved in both transfer-in and transfer-out of the remittance transaction, thereby simultaneously hiding the identity of the remitter and the identity of the actual remittee. Furthermore, because each participant participates in both transfer-in and transfer-out, identity confusion can be realized between the remitter and the actual remittee, thereby further increasing the reliability of identity hiding.

Assume that the transaction remittees of the remittance transaction M are $Q\_1$–$Q\_u$, and corresponding transfer amounts are $t'\_1$–$t'\_u$, where $1 \leq u \leq n$. In the remittance transaction M, similar to the asset amounts $t\_j\_1$–$t\_j\_m$ corresponding to the previous unspent assets, the transfer amounts $t'\_1$–$t'\_u$ are separately recorded in the remittance transaction M as corresponding transfer amount commitments $PC(t'\_1, r'\_1)$–$PC(t'\_u, r'\_u)$, where $r'\_1$–$r'\_u$ are random numbers. The random numbers $r'\_1$–$r'\_u$ can be determined by the remitter, and are notified to corresponding remittees (generally, only the actual remittee needs to be notified) by using an off-chain channel or such methods, so each remittee can perform verification based on the random numbers $r'\_1$–$r'\_u$. For example, remittee w can verify whether $PC(t'\_w, r'\_w) = t'\_w \times G + r'\_w \times H$ is valid, and perform management on an asset corresponding to a transfer amount commitment $PC(t'\_w, r'\_w)$ obtained after the transaction is completed.

In a confidential transaction, it is necessary to prove that none of the transfer amounts $t'\_1$–$t'\_u$ in the remittance transaction M is less than 0. The remitter can use the zero-knowledge proof technology in the related technology to generate corresponding range proofs $RP\_1$–$RP\_u$ for the transfer amounts $t'\_1$–$t'\_u$ to prove $t'1 \geq 0$–$t'\_u \geq 0$, and add these range proofs $RP\_1$–$RP\_u$ to transaction content of the remittance transaction M. The used zero-knowledge proof technology can be a range proof technology, such as the Bulletproofs solution, which is not limited in the present specification.

Step 304: Generate an LSAG signature for the remittance transaction M based on a private key $x\_j$ and a public key $P\_j$ that are held by the remitter, and a public key $P\_i$ held by the masked participant i, where the LSAG signature includes key-images $I\_1$–$I\_m$, and values of the key-images $I\_1$–$I\_m$ are related to the private key $x\_j$, the public key $P\_j$, and asset identifiers $ID\_j\_1$–$ID\_j\_m$ of the remitter.

The remitter needs to maintain one public-private key pair, such as the private key $x\_j$ and the public key $P\_j$. Before the public-private key pair is determined, a number field $Z\_q$ and elliptic-curve signature on the number field need to be determined, for example, elliptic-curve signature Ed25519. Let G and H be two random base points of the elliptic-curve signature, where $|G| = p$ is a large prime number (for example, not less than a certain predetermined value), the private key $x\_j$ of the remitter is selected from a value range $(0, p)$, and the corresponding public key is $P\_j = x\_j \times G$. For another user such as the masked participant, a public-private key pair corresponding to each user is determined in a similar way.

The key-images $I\_1$–$I\_m$ are in a one-to-one correspondence with the unspent assets $ID\_j\_1$–$ID\_j\_m$ provided by the remitter, and are separately used to verify whether the corresponding unspent assets have been spent, so as to alleviate the problem of "double-spending". Values of the key-images $I\_1$–$I\_m$ are related to the asset identifiers $ID\_j\_1$–$ID\_j\_m$ of corresponding assets, so even if all key-images use the same public-private key pair (that is, the private key $x\_j$ and the public key $P\_j$ of the remitter), the generated key-images $I\_1$–$I\_m$ are completely different based on a difference between values of the asset identifiers $ID\_j\_1$–$ID\_j\_m$. Therefore, it is not necessary to maintain one public-private key pair for each asset, so while the problem of "double-spending" is alleviated, the number of public-private key pairs that need to be maintained by each account is unrelated to the number of assets included in the transaction. For example, $I\_d = x\_j \times Hash\_G(P\_j, ID\_j\_d)$, $d \in [1, m]$, where $Hash\_G(\ )$ is a hash function from the previous elliptic-curve signature to itself.

Based on the asset commitments $PC(t\_j\_1, r\_j\_1)$–$PC(t\_j\_m, r\_j\_m)$ corresponding to the unspent assets and the previous transfer amount commitments $PC(t'\_1, r'\_1)$–$PC(t'\_u, r'\_u)$, $P'''\_j = [PC(t\_j\_1, r\_j\_1) + \ldots + PC(t\_j\_m, r\_j\_m)][PC(t'\_1, r'\_1) + \ldots + PC(t'\_u, r'\_u)]$ can be obtained through calculation. In addition, based on the random numbers $r\_j\_1$–$r\_j\_m$ corresponding to the unspent assets and the random numbers $r'\_1$–$r'\_u$ corresponding to the transfer amounts, $r''' = (r\_j\_1 + \ldots + r\_j\_m) - (r'\_1 + \ldots + r'\_u)$ can be obtained through calculation. In addition, based on the asset amounts $t\_j\_1$–$t\_j\_m$ corresponding to the unspent assets and the transfer amounts $t'\_1$–$t'\_u$, $t''' = (t\_j\_1 + \ldots + t\_j\_m) - (t'\_1 + \ldots + t'\_u)$ can be obtained through calculation. Then, as the homomorphic characteristic described above, it can be determined that $P'''\_j = PC(r''', t''') = r''' \times G + t''' \times H$. In addition, the remitter needs to ensure $t\_j\_1 + \ldots + t\_j\_m = t'\_1 + \ldots + t'\_u$, such $t''' = 0$, and $P'''\_j = r''' \times G$ can be determined.

It can be seen in the form that "$P'''\_j = r''' \times G$" is similar to a relationship between a public-private key pair, i.e., "$P\_j = x\_j \times G$". As described below, the masked participant i must satisfy $P'''\_i \neq r''' \times G$, and therefore $r'''$ can be considered as a private key corresponding to the remitter, and $P'''\_j$ can be considered as a public key corresponding to $r'''$. For the purpose of distinguishing the public-private key pair corresponding to the remitter, $r'''$ can be considered as a pseudo private key corresponding to the remitter, and $P'''\_j$ can be considered as a pseudo public key corresponding to the remitter. Similarly, $P'''\_i$ can be considered as a pseudo public key corresponding to the masked participant i. For example, a parameter $P'''\_i=[PC\{i, 1\}+ \ldots +PC\{i, m\}]-[PC(t'\_1, r'\_1)+ \ldots +PC(t'\_u, r'\_u)]$ corresponding to the masked participant i can be calculated, where $i \in [1, j-1] \cup [j+1, n]$. In addition, a difference i between the sum of asset amounts corresponding to m assets held by the masked participant i and the sum of the transfer amounts $t'\_1-t'\_u$ can be obtained through calculation, and a difference $r'''\_i$ between the sum of random numbers corresponding to them assets held by the masked participant i and the sum of random numbers $r'\_1-r'\_u$ corresponding to the transfer amounts $t'\_1-t'\_u$ can be obtained through calculation.

Based on the homomorphic characteristic, $P'''\_i=r'''\_i \times G+ t'''\_i \times H \neq '' \times G$ can be determined. It can be seen that parameters $P'''\_j$ and $r''$ both uniquely correspond to the remitter, and parameter $P'''\_i$ uniquely corresponds to the masked participant i. Therefore, $r''$ can be considered as a pseudo private key corresponding to the remitter, $P'''\_j$ as a pseudo public key corresponding to the remitter, and $P'''\_i$ as a pseudo public key corresponding to the masked participant i.

Based on the private key $x\_j$, the public key $P\_j$, the pseudo private key $r''$, and the pseudo public key $P'''\_j$ that are corresponding to the remitter, and the public key $P\_i$ and the pseudo public key $P'''\_i$ that are corresponding to the masked participant i, the LSAG signature is generated for the remittance transaction M. Therefore, the following two verification functions can be efficiently and compactly implemented: On one hand, because the pseudo public key $P'''\_j$ and the pseudo private key $r''$ satisfy $P'''\_j=r'' \times G$, and the pseudo public key $P'''\_i$ and the pseudo private key $r''$ satisfy $P'''\_i \neq '' \times G$, when the LSAG signature is generated based on the pseudo private key $r''$ and the pseudo public keys $P'''\_j$ and $P'''\_i$, if the LSAG signature is verified, it can prove that a value of a certain pseudo public key in pseudo public keys $(P'''\_1, \ldots, P'''\_n)$ is equal to $r'' \times G$. In addition, the pseudo public key corresponds to $t''=0$, so input and output of the remittance transaction M can be equal. On the other hand, when the LSAG signature is generated based on the private key $x\_j$ and the public key $P\_j$ that are corresponding to the remitter, and the public key $P\_i$ corresponding to the masked participant i, if the LSAG signature is verified, it can prove that the LSAG signature is obtained through signing by using a private key corresponding to a certain public key in public keys $(P\_1, \ldots, P\_n)$. Therefore, identity verification is completed without exposing the identity of the remitter. Certainly, if it is not considered whether the input and output of the remittance transaction M are equal to each other, the LSAG signature can also be directly generated based on the private key $x\_j$ and the public key $P\_j$ that are corresponding to the remitter, and the public key $P\_i$ corresponding to the masked participant i, without using the pseudo private key $r''$ and the pseudo public key $P'''\_j$ that are corresponding to the remitter and the pseudo public key $P'''\_i$ corresponding to the masked participant i. This is not limited in the present specification.

In addition to the previous key-images $I\_1-I\_m$, the remitter can further generate a key-image $I\_(m+1)=r'' \times \text{Hash}\_G(P'''\_j)$ based on the pseudo private key $r''$ and the pseudo public key $P'''\_j$, so as to form a total of m+1 key-images with the key-images $I\_1-I\_m$, so as to jointly alleviate the problem of "double-spending". Actually, because a value of the pseudo private key $r''$ and a value of the pseudo public key $P'''\_j$ are random, pseudo private keys $r''$ and pseudo public keys $P'''\_j$ generated in different transactions are different. Therefore, when the key-image $I\_(m+1)$ is generated based on the pseudo private key $r''$ and the pseudo public key $P'''\_j$, a one-to-one correspondence is formed between the key-image $I\_(m+1)$ and a corresponding transaction. Therefore, the key-image $I\_(m+1)$ is compared with a historical key-image, to identify a replay problem for the remittance transaction M. If the key-image $I\_(m+1)$ has the same historical key-image, it indicates that the remittance transaction M is replayed.

Step 306: Submit a signed remittance transaction M to a blockchain network, where after the transaction is completed, the key-images $I\_1-I\_m$ are added to a historical key-image set, and the unspent assets $ID\_j\_1-ID\_j\_m$ are kept in the blockchain ledger as assets held by the remitter.

After receiving the remittance transaction M, a blockchain node can compare the key-images $I\_1-I\_m$ with the historical key-image set, so as to determine whether historical key-images that are the same as the key-images $I\_1-I\_m$ exist in the historical key-image set. The historical key-image set is used to store key-images corresponding to assets that have been previously spent. If there is a historical key-image that is the same as a certain key-image in the key-images $I\_1-I\_m$, it indicates that an asset corresponding to the key-image has been spent, that is, a problem of "double-spending" occurs, and execution of the remittance transaction M should be prevented. If the key-images $I\_1-I\_m$ do not belong to the historical key-image set, it indicates that none of the assets $ID\_j\_1-ID\_j\_m$ corresponding to the key-images $I\_1-I\_m$ is spent. When another transaction execution condition is met, the remittance transaction M can be executed. In addition, after the remittance transaction M is completed, the assets $ID\_j\_1-ID\_j\_m$ corresponding to the key-images $I\_1-I\_m$ are all spent, and therefore, the key-images $I\_1-I\_m$ need to be added to the historical key-image set, so as to subsequently detect the problem of "double-spending" related to the key-images $I\_1-I\_m$.

In the account model used in Ethereum for example, after a remitter has spent an amount through a transaction, an account balance in a corresponding account is updated immediately, that is, the spent amount is deducted, thereby ensuring the accuracy of the account balance. However, in the technical solution of the present specification, after the remittance transaction M is completed, although the assets $ID\_j\_1-ID\_j\_m$ in the corresponding account of the remitter are spent, the corresponding account of the remitter is not immediately updated, that is, the assets $ID\_j\_1-ID\_j\_m$ in the corresponding account of the remitter do not need to be immediately deleted. Therefore, when any user queries the corresponding account of the remitter by using the blockchain ledger, the user does not perceive an asset change after the remittance transaction M is completed, thereby alleviating exposing a real identity that is borne by the remitter in the remittance transaction M due to the asset change. In addition, although the corresponding account of the remitter includes both spent and unspent assets, based on maintenance of the previous historical key-image set, it can be ensured that the remitter can actually spend only the unspent assets and accurately detect a "double-spending" operation performed by the remitter on the spent assets.

Certainly, to alleviate excessive accumulation of assets in an account and increase maintenance costs of a blockchain node, and to facilitate each user to manage assets in an account of the user, the user can clean up spent assets in the account of the user. Taking the previously mentioned remitter as an example, the remitter can initiate an asset deletion request to the blockchain network to delete at least a part of assets that the remitter has spent from the blockchain ledger. For example, the remitter can specify an asset identifier corresponding to an asset to be deleted, or the remitter can specify a time period (two endpoints of the time period can be specified; if only the left endpoint is specified, the time period is from the time corresponding to the left endpoint to the current time; if only the right endpoint is specified, the time period is from the time when the account is created to the time corresponding to the right endpoint) and delete all assets generated or spent in the time period.

It can be known from the previous description that the remittance transaction M generated by the remitter can include the following transaction content:

1) the remitter, the masked participant i, and assets: {[P_1:ID 1_1, . . . ,ID 1 m], [P_2:ID_2_1, . . . , ID_2_m], . . . , [P_n:ID_n_1, . . . , ID_n_m]}, where P_1-P_n are public keys of the remitter and the masked participant, for example, the public key P_j corresponding to the remitter and the public key P_i corresponding to the masked participant i, and i∈[1, j−1]∪[j+1, n].

2) The transaction remittee and its transfer amounts: {[Q_1,PC(t'_1, r'_1)], [Q_2,PC(t'_2, r'_2)], . . . , [Q_u,PC (t'_u, r'_u)]}.

3) the range proofs RP_1-RP_u.

Certainly, the remittance transaction M can further include other transaction content required in the blockchain network. References can be made to related requirements in the related technology, which are not listed one by one here.

Then, the remitter can perform hash calculation on the transaction content of the remittance transaction M, and the parameter M can represent a determined hash value. The remitter can generate an LSAG signature for the hash value M. Certainly, the remitter can also directly generate an LSAG signature for the entire transaction content, which may result in a relatively large calculation amount.

Figure 5:
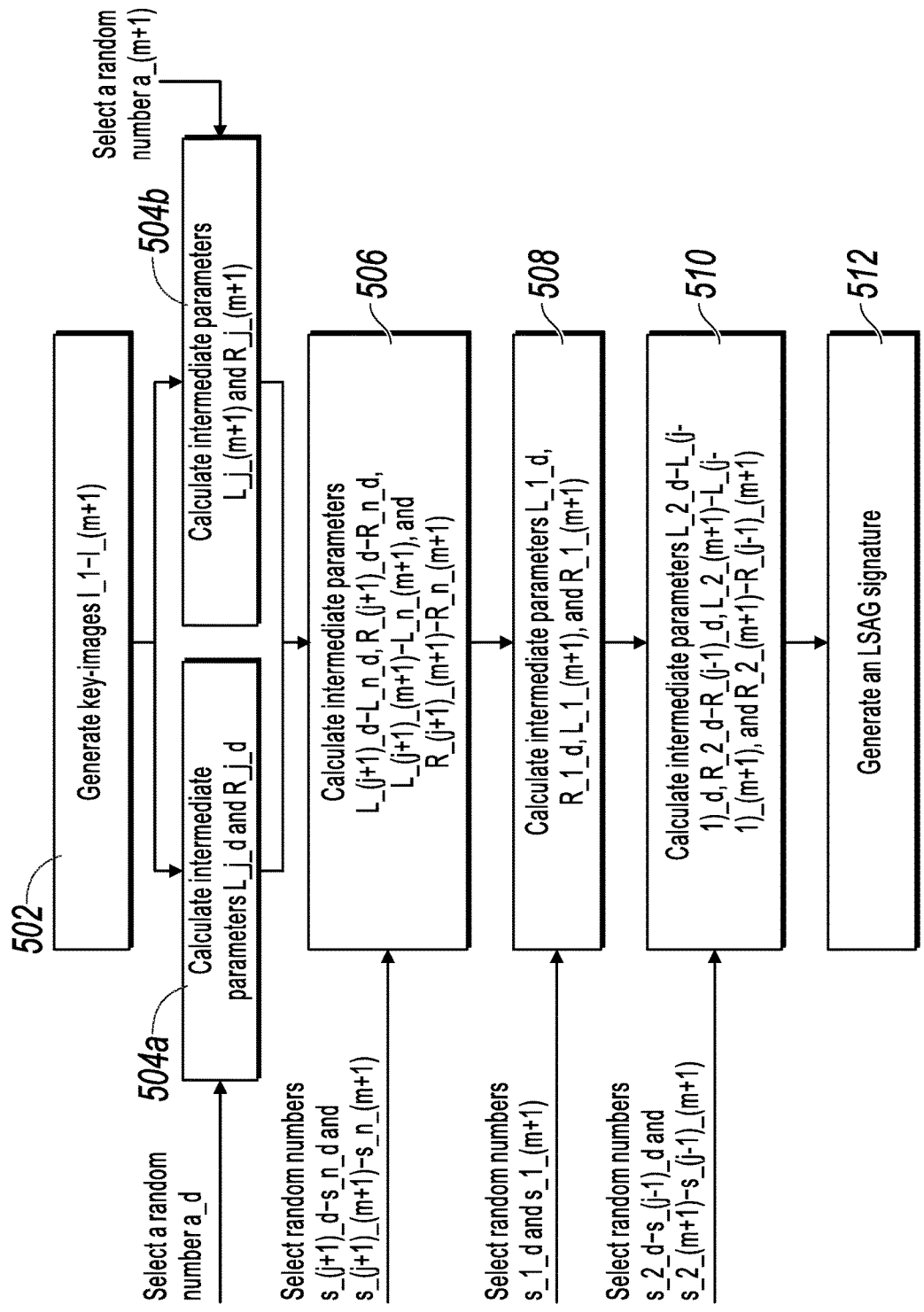
FIG. 5 is a flowchart of generating an LSAG signature, according to an example implementation.

With reference to FIG. 5, the following describes a process of generating the LSAG signature for the remittance transaction M based on the private key x_j, the public key P_j, the pseudo private key r'', and the pseudo public key P''_j that are corresponding to the remitter, and the public key P_i and the pseudo public key P''_i that are corresponding to the masked participant i. FIG. 5 is a flowchart of generating an LSAG signature, according to an example implementation. As shown in FIG. 5, the following steps can be included:

Step 502: Generate key-images I_1-I_(m+1).

For a process of generating the key-images I_1-I_(m+1), refer to the previous content. Details are omitted here for simplicity.

$$I\_d = x\_j \times \text{Hash\_G}(P\_j, ID\_j\_d), d \in [1,m]; I\_(m+1) = r'' \times \text{Hash\_G}(P''\_j).$$

Step 504a: Calculate intermediate parameters L_j_d and R_j_d.

The remitter can select random numbers a_d (that is, a_1-a_m) from a number field Z_q, and calculate the intermediate parameters L_j_d and R_j_d based on the following equation:

$$L\_j\_d = a\_d \times G$$

$$R\_j\_d = a\_d \times \text{Hash\_G}(P\_j, ID\_j\_d)$$

Therefore, the remitter can obtain L_j_d: L_j_1-L_j_m and R_j_d: R_j_1-R_j_m through calculation.

Further, the remitter can generate intermediate parameters L_i_d and R_i_d corresponding to the masked participant i, which includes: separately generating the intermediate parameters L_i_d and R_i_d based on values of the intermediate parameters L_j_d and R_j_d, which is described in the following steps 506 to 510.

Step 504b: Calculate intermediate parameters L_j (m+1) and R_j (m+1).

The remitter can select random numbers a (m+1) from the number field Z_q, and calculate the intermediate parameters L_j (m+1) and R_j (m+1) based on the following equation:

$$L\_j\_(m+1) = a\_(m+1) \times G$$

$$R\_j\_(m+1) = a\_(m+1) \times \text{Hash\_G}(P''\_j)$$

Therefore, the remitter can calculate L_j_(m+1) and R_j_(m+1). Further, the remitter can generate intermediate parameters L_i_(m+1) and R_i_(m+1) corresponding to the masked participant i, which is described in the following steps 506 to 510.

Step 506: Calculate intermediate parameters L_(j+1)_d–L_n_d, R_(j+1)_d–R_n_d, L_(j+1)_(m+1)–L_n_(m+1), and R_(j+1)_(m+1)–R_n_(m+1).

When i=j+1-n, the calculation processes of the intermediate parameters L_i_d and R_i_d satisfy the following equations:

$$L\_i\_d = (s\_i\_d \times G + c\_i \times P\_i) \bmod p$$

$$R\_i\_d = [s\_i\_d \times \text{Hash\_G}(P\_i, ID\_i\_d) + c\_i \times I\_d] \bmod p$$

Meanwhile, the calculation processes of the intermediate parameters L_i_(m+1) and R_i_(m+1) satisfy the following equations:

$$L\_i\_(m+1) = [s\_i\_(m+1) \times G + c\_i \times P''\_i] \bmod p$$

$$R\_i\_(m+1) = [s\_i\_(m+1) \times \text{Hash\_G}(P''\_i) + c\_i \times I\_(m+1)] \bmod p$$

In the calculation process, s_(j+1)_d–s_n_d and s_(j+1)_(m+1)–s_n_(m+1) are involved, all of which are random numbers in the number field Z_q. In addition, in the calculation process, c_(j+1)–c_n are involved, and a calculation process of c_(j+1)–c_n satisfy the following equation: c_i=Hash[M, L_(i−1)_1, R_(i−1)_1, . . . , L_(i−1)_(m+1), R_(i−1)_(m+1)], where Hash( ) is a hash function from the above elliptic-curve signature to the number field Z_q.

When L_j_d, R_j_d, L_j_(m+1), and R_j_(m+1) are obtained through calculation in steps 504a and 504b, the intermediate parameters L_i_d and R_i_d when i∈[j+1,n] are obtained through calculation based on L_j_d and R_j_d, that is, the previous L_(j+1)_d–L_n_d and R_(j+1)_d–R_n_d. Specifically, first, c_(j+1)=Hash[M, L_j_1, R_j_1, . . . , L_j_(m+1), R_j_(m+1)] is calculated based on values of L_j_d, R_j_d, L_j_(m+1), and R_j_(m+1). L_(j+1)_d and R_(j+1)_d are calculated based on the random number s_(j+1)_d and the calculated c_(j+1). That is, L_(j+1)_1 and R_(j+1)_1 are calculated based on the random number s_(j+1)_1 and the calculated c_(j+1); L_(j+1)_2 and R_(j+1)_2 are calculated based on the random number s_(j+1)_2 and the calculated c_(j+1), . . . , and L_(j+1)_m and R_(j+1)_m are calculated based on the random number s_(j+1)_m and the calculated c_(j+1); then, c_(j+2) is calculated based on values of L_(j+1)_d and R_(j+1) d, and L_(j+2)_d and R_(j+2)_d are calculated based on the random number s_(j+2)_d and the calculated c_(j+2), by analogy, until L_n_d and R_n_d are calculated.

Similarly, based on the random number s_i_(m+1), the pseudo public key P''_i, the calculated c_i, and the key-image I_(m+1), the intermediate parameters L_(j+1)_(m+1)–L_n_(m+1) and R_(j+1)_(m+1)–R_n_(m+1) can be calculated based on the previous equation separately. Details are omitted here for simplicity.

Step 508: Calculate intermediate parameters $L\_1\_d$, $R\_1\_d$, $L\_1\_(m+1)$, and $R\_1\_(m+1)$.

The calculation processes of the intermediate parameters $L\_1\_d$ and $R\_1\_d$ satisfy the following equations:

$$L\_1\_d = (s\_1\_d \times G + c\_1 \times P\_1) \bmod p$$

$$R\_1\_d = (s\_1\_d \times \text{Hash}\_G(P\_1, ID\_1\_d) + c\_1 \times I\_d) \bmod p$$

Meanwhile, the calculation processes of the intermediate parameters $L\_1\_(m+1)$ and $R\_1\_(m+1)$ satisfy the following equations:

$$L\_1\_(m+1) = [s\_1\_(m+1) \times G + c\_1 \times P''\_1] \bmod p$$

$$R\_1\_(m+1) = [s\_1\_(m+1) \times \text{Hash}\_G(P\_1) + c\_1 \times I\_(m+1)] \bmod p$$

$s\_1\_d$ and $s\_1\_(m+1)$ are both random numbers in the number field $Z\_q$, and $c\_1 = \text{Hash}[M, L\_n\_1, R\_n\_1, L\_n\_(m+1), R\_n\_(m+1)]$. Each intermediate parameter is in compliance with a ring value determining rule. The intermediate parameters are expressed as $L\_1\_d$–$L\_n\_d$, $R\_1\_d$–$R\_n\_d$, $L\_1\_(m+1)$–$L\_n\_(m+1)$, and $R\_1\_(m+1)$–$R\_n\_(m+1)$. However, $L\_1\_d$, $R\_1\_d$, $L\_1\_(m+1)$, and $R\_1\_(m+1)$ are not top ranked, and $L\_n\_d$, $R\_n\_d$, $L\_n\_(m+1)$, and $R\_n\_(m+1)$ are not last ranked. Actually, it should be considered that $L\_1\_d$ and $L\_n\_d$ are adjacent, $R\_1\_d$ and $R\_n\_d$ are adjacent, $L\_1\_(m+1)$ and $L\_n\_(m+1)$ are adjacent, and $R\_1\_(m+1)$ and $R\_n\_(m+1)$ are adjacent. Therefore, when $c\_1 = \text{Hash}[M, L\_n\_1, R\_n\_1, L\_n\_(m+1), R\_n\_(m+1)]$, it also satisfies the previous $c\_i = \text{Hash}[M, L\_(i-1)\_1, R\_(i-1)\_1, L\_(i-1)\_(m+1), R\_(i-1)\_(m+1)]$ described in step 506. That is, the calculation equation of $c\_1$ is consistent with the calculation equation of $c\_(j+1)$–$c\_n$.

Step 510: Calculate intermediate parameters $L\_2\_d$–$L\_(j-1)\_d$, $R\_2\_d$–$R\_(j-1)\_d$, $L\_2\_(m+1)$–$L\_(j-1)\_(m+1)$, and $R\_2\_(m+1)$–$R\_(j-1)\_(m+1)$.

When $i = 2$–$j-1$, the calculation processes of the intermediate parameters $L\_i\_d$ and $R\_i\_d$ satisfy the following equations:

$$L\_i\_d = (s\_i\_d \times G + c\_i \times P\_i) \bmod p$$

$$R\_i\_d = (s\_i\_d \times \text{Hash}\_G(P\_i, ID\_i\_d) + c\_i \times I\_d) \bmod p$$

Meanwhile, the calculation processes of the intermediate parameters $L\_i\_(m+1)$ and $R\_(m+1)$ satisfy the following equations:

$$L\_i\_(m+1) = [s\_i\_(m+1) \times G + c\_i \times P''\_i] \bmod p$$

$$R\_i\_(m+1) = [s\_i\_(m+1) \times \text{Hash}\_G(P''\_i) + c\_i \times I\_(m+1)] \bmod p$$

In the calculation process, $s\_2\_d$–$s\_(j-1)\_d$ and $s\_2\_(m+1)$–$s\_(j-1)\_(m+1)$ are involved, and are random numbers in the number field $Z\_q$. In the calculation process, $c\_2$–$c\_(j-1)$ are involved, and calculation processes of $c\_2$–$c\_(j-1)$ satisfy the following equation: $c\_i = \text{Hash}(M, L\_(i-1)\_1, R\_(i-1)\_1, \ldots, L\_(i-1)\_(m+1), R\_(i-1)\_(m+1))$.

Therefore, when $L\_1\_d$, $R\_1\_d$, $L\_1\_(m+1)$, and $R\_1\_(m+1)$ have been calculated in step 508, the intermediate parameters $L\_i\_d$ and $R\_i\_d$ with $i \in [2, j-1]$ can be calculated based on $L\_1\_d$, $R\_1\_d$, $L\_1\_(m+1)$, and $R\_1\_(m+1)$, which are previously described $L\_2\_d$–$L\_(j-1)\_d$, and $R\_2\_d$–$R\_(j-1)\_d$. Specifically, c2 is first calculated based on values of $L\_1\_d$, $R\_1\_d$, $L\_1\_(m+1)$, and $R\_1\_(m+1)$, and $L\_2\_d$ and $R\_2\_d$ are calculated based on the random number $s\_2\_d$ and the calculated $c\_2$. That is, $L\_2\_1$ and $R\_2\_1$ are calculated based on a random number $s\_2\_1$ and the calculated $c\_2$, $L\_2\_2$ and $R\_2\_2$ are calculated based on a random number $s\_2\_2$ and the calculated $c\_2$, \ldots, and $L\_2m$ and $R\_2m$ are calculated based on a random number $s\_2m$ and the calculated $c\_2$. Then, $c\_3$ is calculated based on values of $L\_2\_d$ and $R\_2\_d$, $L\_3\_d$ and $R\_3\_d$ are calculated based on a random number $s\_3\_d$ and the calculated $c\_3$, by analogy, until $L\_(j-1)\_d$ and $R\_(j-1)\_d$ are calculated.

Similarly, based on the random number $s\_i\_(m+1)$, the pseudo public key $P''\_i$, the calculated $c\_i$, and the key-image $I\_(m+1)$, the intermediate parameters $L\ 2\ (m+1)$–$L\_(j-1)\_(m+1)$ and $R\ 2\ (m+1)$–$R\_(j-1)\_(m+1)$ can be calculated based on the previous equation separately. Details are omitted here for simplicity.

Step 512: Generate a ring signature.

Based on the processing procedures of the previous steps, key-images $I\_1, \ldots, (m+1)$, $c\_1$, $s\_1\_d$–$s\_(j-1)d$, $s\_(j+1)\_d$–$s\_n\_d$, $s\_1\_(m+1)$–$s\_(j-1)\_(m+1)$, and $s\_(j+1)\_(m+1)$–$s\_n\_(m+1)$ can be obtained, and $s\_j\_d$ and $s\_j\_(m+1)$ need to be calculated by a signer based on the following equations:

$$s\_j\_d = (a\_d - c\_j \times x\_j) \bmod p$$

$$s\_j\_(m+1) = (a\_(m+1) - c\_j \times r'') \bmod p$$

$$c\_j = \begin{cases} \text{Hash}[M, L\_n\_1, R\_n\_1, \ldots, L\_n\_(m+1), R\_n\_(m+1)], j = 1 \\ \text{Hash}[M, L\_(j-1)\_1, R\_(j-1)\_1, \ldots, L\_(j-1)\_(m+1), \\ R\_(j-1)\_(m+1)], j \in [2, n] \end{cases}$$

The value of $c\_j$ in the previous equation is divided into two cases. A value of parameter j is actually fixed, for example, the value of parameter j is fixed to 1 or is fixed to a certain value in $[2, n]$. This should be distinguished from the previous parameters i and e (there are $n-1$ values of parameter i, which are respectively $1$–$j-1$ and $j+1$–$n$; and there are m values of parameter e, which are respectively $1$–$m$). In addition, similar to the previous description of $c\_1$, the intermediate parameters are in compliance with the ring value determining rule. For ease of description, the intermediate parameters are expressed as $L\_1\_d$–$L\_n\_d$, $R\_1\_d$–$R\_n\_d$, $L\_1\_(m+1)$–$L\_n\_(m+1)$, and $R\_1\_(m+1)$–$R\_n\_(m+1)$. But $L\_1\_d$, $R\_1\_d$, $L\_1\_(m+1)$, and $R\_1\_(m+1)$ are not top ranked, and $L\_n\_d$, $R\_n\_d$, $L\_n\_(m+1)$ and $R\_n\_(m+1)$ are not last ranked. Actually it should be considered that $L\_1\_d$ and $L\_n\_d$ are adjacent, $R\_1\_d$ and $R\_n\_d$ are adjacent, $L\_1\_(m+1)$ and $L\_n\_(m+1)$ are adjacent, and $R\_1\_(m+1)$ and $R\_n\_(m+1)$ are adjacent. Therefore, when $c\_1 = \text{Hash}(M, L\_n\_1, R\_n\_1, \ldots, L\_n\_(m+1), R\_n\_(m+1))$, it actually also satisfies $c\_j = \text{Hash}(M, L\_(j-1)\_1, R\_(j-1)\_1, \ldots, L\_(j-1)\_(m+1), R\_(j-1)\_(m+1))$.

Therefore, the remitter can generate a ring signature $[I\_1, \ldots, I\_(m+1), c\_1, s\_1\_1, \ldots, s\_1\_(m+1), \ldots, s\_n\_1, \ldots, s\_n\_(m+1)]$, which includes key-images $I\_1$–$I\_(m+1)$, random numbers $s\_i\_1$–$s\_i\_(m+1)$, derived value $s\_j\_1$–$s\_j\_(m+1)$, and $c\_1$.

Figure 6:
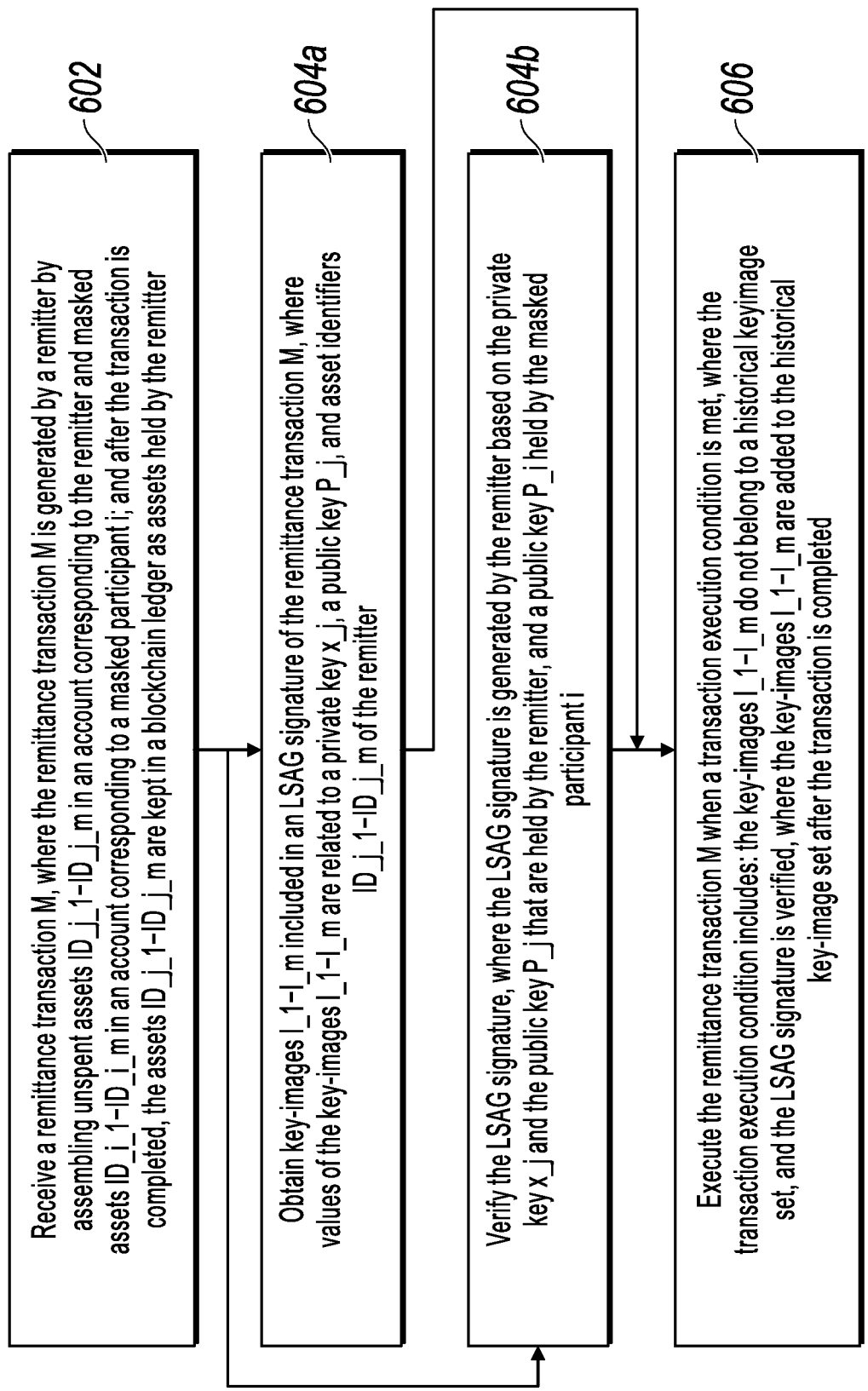
FIG. 6 is a flowchart illustrating another anonymous transaction method based on a ring signature, according to an example implementation.

FIG. 6 is a flowchart illustrating another anonymous transaction method based on a ring signature, according to an example implementation. As shown in FIG. 6, the method is applied to a blockchain node, and the blockchain node verifies the LSAG signature generated in the implementation shown in FIG. 3 and performs other necessary verification operations on a remittance transaction M. The method can include the following steps:

Step 602: Receive a remittance transaction M, where the remittance transaction M is generated by a remitter by assembling unspent assets $ID\_j\_1$–$ID\_j\_m$ in an account corresponding to the remitter and masked assets $ID\_i\_1$–$ID\_i\_m$ in an account corresponding to a masked participant i; and after the transaction is completed, the assets $ID\_j\_1$–$ID\_j\_m$ are kept in a blockchain ledger as assets held by the remitter.

As mentioned above, for the purpose of privacy protection of held assets, assets held by the remitter and any other user are recorded on the blockchain ledger as corresponding commitment amounts rather than plaintext asset amounts. The unspent assets $ID\_j\_1$–$ID\_j\_m$ are used as an example, and $ID\_j\_1$–$ID\_j\_m$ are asset identifiers to distinguish between different assets. Assume that asset amounts of the unspent assets $ID\_j\_1$–$ID\_j\_m$ are $t\_j\_1$–$t\_j\_m$, the asset amounts $t\_j\_1$–$t\_j\_m$ can be recorded on the blockchain ledger as corresponding asset commitments $PC(t\_j\_1, r\_j\_1)$–$PC(t\_j\_m, r\_j\_m)$, where $r\_j\_1$–$r\_j\_m$ are random numbers. Because of the existence of the random numbers $r\_j\_1$–$r\_j\_m$, the asset commitments $PC(t\_j\_1, r\_j\_1)$–$PC(t\_j\_m, r\_j\_m)$ generated by using the amounts $t\_j\_1$–$t\_j\_m$ are random. Except the remitter who knows the random numbers $t\_j\_1$–$t\_j\_m$, other users can see only the asset commitments $PC(t\_j\_1, r\_j\_1)$–$PC(t\_j\_m, r\_j\_m)$, and cannot deduce the corresponding asset amounts $t\_j\_1$–$t\_j\_m$ accordingly.

Similarly, for the masked assets $ID\_i\_1$–$ID\_i\_m$, $ID\_i\_1$–$ID\_i\_m$ are asset identifiers used to distinguish between different assets. Assume that asset amounts of the masked assets $ID\_i\_1$–$ID\_i\_m$ are $t\_i\_1$–$t\_i\_m$, the asset amounts $t\_i\_1$–$t\_i\_m$ can be recorded on the blockchain ledger as corresponding asset commitments $PC(t\_i\_1, i\_1)$–$PC(t\_i\_m, r\_i\_m)$, where $r\_i\_1$–$r\_i\_m$ are random numbers. For example, a masked participant 1 holds masked assets $ID\_1\_1$–$ID\_1\_m$, and corresponding asset amounts are $t\_1\_1$–$t\_1\_m$. In this case, the blockchain ledger can record asset commitments $PC(t\_1\_1, 1\_1)$–$PC(t\_1\_m, r\_1\_m)$ corresponding to the asset amounts $t\_1\_1$–$t\_1\_m$, where $r\_1\_1$–$r\_1\_m$ are random numbers held only by the masked participant 1.

For example, an asset can be recorded and stored in a form similar to [ID, asset commitment] on the blockchain ledger. For example, the unspent assets $ID\_j\_1$–$ID\_j\_m$ can be recorded as $[ID\_j\_1, PC(t\_j\_1, r\_j\_1)][ID\_j\_m, PC(t\_j\_m, r\_j\_m)]$, and the masked assets $ID\_i\_1$–$ID\_i\_m$ corresponding to the masked participant i can be recorded as $[ID\_i\_1, PC\{i, 1\}][ID\_i\_m, PC\{i, m\}]$. Certainly, this is only an example, and the blockchain ledger can actually use other forms. For example, when multiple asset types exist, the assets can be recorded and stored in a form similar to [type, ID, asset commitment]. In the process of calculating asset amounts and executing transactions, impact of the asset type needs to be considered, for example, proportion conversion of asset amounts exists between assets of different types. In addition to directly recording the asset commitment, other information can be stored at the same time. The unspent asset $ID\_j\_m$ is used as an example, and can be recorded as $[ID\_j\_m, E(t\_j\_m, r\_j\_m)]$, where $E(t\_j\_m, r\_j\_m)=[PC(t\_j\_m, r\_j\_m), E(t\_j\_m), E(r\_j\_m)]$. $E(t\_j\_m)$ and $E(r\_j\_m)$ are homomorphic ciphers corresponding to an asset amount $t\_j\_m$ and a random number $r\_j\_m$, and can be obtained by encrypting the asset amount $t\_j\_m$ and the random number $r\_j\_m$ by using a homomorphic encryption key of the remitter (which is obtained by performing homomorphic encryption on the public key $P\_j$). For ease of understanding, the following is described by using an asset form of [ID, asset commitment] as an example.

As described above, in the present specification, the assets held by the user are managed in an "account" form. References can be made to the previous related description with reference to FIG. 4, and details are omitted here for simplicity. In brief, based on an asset account model in the present specification, a corresponding account can be generated for each user, and assets held by the user are managed based on the account.

From the point of view of transfer-in of the remittance transaction M, roles of the remitter and the masked participant are involved, and from the point of view of transfer-out, roles of the actual remittee and the transaction remittee are involved. Some of these roles may overlap.

For the remitter and the masked participant, the remittance transaction M is assembled based on the unspent assets $ID\_j\_1$–$ID\_j\_m$ in the account corresponding to the remitter and the masked assets $ID\_i\_1$–$ID\_i\_m$ in the account corresponding to the masked participant i, and an LSAG signature generated in the following is added, so the masked participant i can hide the identity of the remitter, and other users cannot determine which user in the "remitter and the masked participant i" spends assets. Here, the masked participant can include any user other than the remitter. For example, the masked participant can include an actual remittee of the remittance transaction M. For example, when the remitter is user A, and actual remittees are user B and user C, user B and user C are configured as masked participants, so user B and user C can perform identity hiding on user A. In addition, because user B and user C both belong to a "transaction remitter" and a "transaction remittee", stronger confusion is implemented. For another example, the masked participant can include another user that is different from the remitter and the actual remittees. For example, when the remitter is user A, and the actual remittees are user B and user C, an irrelevant user D can be configured as the masked participant, so as to perform identity hiding on user A. For another example, the masked participants can include both the actual remittees and another user. For example, when the remitter is user A, and the actual remittees are user B and user C, user B, user C, and user D can be configured as the masked participants, so as to perform identity hiding on user A.

For the actual remittee and the transaction remittee, in an implementation, the transaction remittee can be the actual remittee, and in this case, the sum of the asset amounts $t\_j\_1$–$t\_j\_m$ corresponding to the unspent assets $ID\_j\_1$–$ID\_j\_m$ is exactly equal to the sum of transfer amounts corresponding to all the actual remittees, that is, no change exists. In another implementation, in addition to the actual remittee, the transaction remittee can further include the remitter. In this case, there may be two cases: In one case, the remitter is not intentionally set as the transaction remittee, but because the sum of the asset amounts $t\_j\_1$–$t\_j\_m$ corresponding to the unspent assets $ID\_j\_1$–$ID\_j\_m$ is greater than the sum of the transfer amounts corresponding to all the actual remittees, there is a change that needs to be returned to the remitter, and the change (that is, the transfer amount corresponding to the remitter) is a difference between the sum of asset amounts $t\_j\_1$–$t\_j\_m$ and the sum of the transfer amounts. In the other case, although there is no change, the remitter can still be set as the transaction remittee, so the remitter can mask the actual remittee to some extent, and in this case, the transfer amount corresponding to the remitter can be set to 0, so as to alleviate affecting the original transfer operation. In yet another implementation. In another implementation, the transaction remittee can include a masked participant that is different from the actual remittee and the remitter, an identity of the actual remittee is hidden by the masked participant, and a transfer amount corresponding to the masked participant is 0. Certainly, in addition to the masked participant, the transaction remittee can include the remitter. When no change exists, transfer amounts corresponding to both the remitter and the masked participant are 0. When a change exists, the transfer amount corresponding to the remitter is a change amount, and the transfer amount corresponding to the masked participant is 0.

Based on actual situations, the identity of the remitter can be hidden only by using the masked participant, and the identity of the actual remittee can be further hidden. In an implementation, participants in the remittance transaction M can include the remitter, the actual remittee, and the masked participant different from the remitter and the actual remittee. These users constitute a total of n participants, and then participants are all involved in both transfer-in and transfer-out of the remittance transaction, thereby simultaneously hiding the identity of the remitter and the identity of the actual remittee. Furthermore, because each participant participates in both transfer-in and transfer-out, identity confusion can be realized between the remitter and the actual remittee, thereby further increasing the reliability of identity hiding.

Assume that the transaction remittees of the remittance transaction M are $Q\_1$–$Q\_u$, and corresponding transfer amounts are $t'\_1$–$t'\_u$, where $1 \le u \le n$. In the remittance transaction M, similar to the asset amounts $t\_j\_1$–$t\_j\_m$ corresponding to the previous unspent assets, the transfer amounts $t'\_1$–$t'\_u$ are separately recorded in the remittance transaction M as corresponding transfer amount commitments $PC(t'\_1, r'\_1)$–$PC(t'\_u, r'\_u)$, where $r'\_1$–$r'\_u$ are random numbers. The random numbers $r'\_1$ $r'\_u$ can be determined by the remitter, and are notified to corresponding remittees (generally, only the actual remittee needs to be notified) by using an off-chain channel, so each remittee can perform verification based on the random numbers $r'\_1$–$r'\_u$. For example, remittee w can verify whether $PC(t'\_w, r'\_w) = t'\_w \times G + r'\_w \times H$ is valid, and perform management on an asset corresponding to a transfer amount commitment $PC(t'\_w, r'\_w)$ obtained after the transaction is completed.

In the account model used in Ethereum for example, after a remitter has spent an amount through a transaction, an account balance in a corresponding account is updated immediately, that is, the spent amount is deducted, thereby ensuring the accuracy of the account balance. However, in the technical solution of the present specification, after the remittance transaction M is completed, although the assets $ID\_j\_1$–$ID\_j\_m$ in the corresponding account of the remitter are spent, the corresponding account of the remitter is not immediately updated, that is, the assets $ID\_j\_1$–$ID\_j\_m$ in the corresponding account of the remitter do not need to be immediately deleted. Therefore, when any user queries the corresponding account of the remitter by using the blockchain ledger, the user does not perceive an asset change after the remittance transaction M is completed, thereby alleviating exposing a real identity that is borne by the remitter in the remittance transaction M due to the asset change. In addition, although the corresponding account of the remitter includes both spent and unspent assets, based on maintenance of a historical key-image set, it can be ensured that the remitter can actually spend only the unspent assets and accurately detect a "double-spending" operation performed by the remitter on the spent assets.

Certainly, to alleviate excessive accumulation of assets in an account and increase maintenance costs of a blockchain node, and to facilitate each user to manage assets in an account of the user, the user can clean up spent assets in the account of the user. Taking the previously mentioned remitter as an example, the remitter can initiate an asset deletion request to the blockchain network to delete at least a part of assets that the remitter has spent from the blockchain ledger. For example, the remitter can specify an asset identifier corresponding to an asset to be deleted, or the remitter can specify a time period (two endpoints of the time period can be specified; if only the left endpoint is specified, the time period is from the time corresponding to the left endpoint to the current time; if only the right endpoint is specified, the time period is from the time when the account is created to the time corresponding to the right endpoint) and delete all assets generated or spent in the time period.

Step 604*a*: Obtain key-images $I\_1$–$I\_m$ included in an LSAG signature of the remittance transaction M, where values of the key-images $I\_1$–$I\_m$ are related to a private key $x\_j$, a public key $P\_j$, and asset identifiers $ID\_j\_1$–$ID\_j\_m$ of the remitter.

The remitter needs to maintain one public-private key pair, such as the private key $x\_j$ and the public key $P\_j$. Before the public-private key pair is determined, a number field $Z\_q$ and elliptic-curve signature on the number field need to be determined, for example, elliptic-curve signature Ed25519. Let G and H be two random base points of the elliptic-curve signature, where $|G|=p$ is a large prime number (for example, not less than a certain predetermined value), the private key $x\_j$ of the remitter is selected from a value range $(0, p)$, and the corresponding public key is $P\_j = x\_j \times G$. For another user such as the masked participant, a public-private key pair corresponding to each user is determined in a similar way.

The key-images $I\_1$–$I\_m$ are in a one-to-one correspondence with the unspent assets $ID\_j\_1$–$ID\_j\_m$ provided by the remitter, and are separately used to verify whether the corresponding unspent assets have been spent, so as to alleviate the problem of "double-spending". Values of the key-images $I\_1$–$I\_m$ are related to the asset identifiers $ID\_j\_1$–$ID\_j\_m$ of corresponding assets, so even if all key-images use the same public-private key pair (that is, the private key $x\_j$ and the public key $P\_j$ of the remitter), the generated key-images $I\_1$–$I\_m$ are completely different based on a difference between values of the asset identifiers $ID\_j\_1$–$ID\_j\_m$. Therefore, it is not necessary to maintain one public-private key pair for each asset, so while the problem of "double-spending" is alleviated, the number of public-private key pairs that need to be maintained by each account is unrelated to the number of assets included in the transaction. For example, $I\_d = x\_j \times \text{Hash\_G}(P\_j, ID\_j\_d)$, $d \in [1, m]$, where $\text{Hash\_G}(\ )$ is a hash function from the previous elliptic-curve signature to itself.

After receiving the remittance transaction M, a blockchain node can compare the key-images $I\_1$–$I\_m$ with the historical key-image set, so as to determine whether historical key-images same as the key-images $I\_1$–$I\_m$ exist in the historical key-image set. The historical key-image set is used to store key-images corresponding to assets that have been previously spent. If there is a historical key-image that is the same as a certain key-image in the key-images $I\_1$–$I\_m$, it indicates that an asset corresponding to the key-image has been spent, that is, a problem of "double-spending" occurs, and execution of the remittance transaction M should be prevented. If the key-images $I\_1$–$I\_m$ do not belong to the historical key-image set, it indicates that none of the assets ID_j_1–ID_j_m corresponding to the key-images I_1–I_m is spent. When another transaction execution condition is met, the remittance transaction M can be executed. In addition, after the remittance transaction M is completed, the assets ID_j_1–ID_j_m corresponding to the key-images I_1–I_m are all spent, and therefore, the key-images I_1–I_m need to be added to the historical key-image set, so as to subsequently detect the problem of "double-spending" related to the key-images I_1–I_m.

Step 604*b*: Verify the LSAG signature, where the LSAG signature is generated by the remitter based on the private key x_j and the public key P_j that are held by the remitter, and a public key P_i held by the masked participant i.

The LSAG signature can be directly generated by the remitter based on the private key x_j and the public key P_j that are corresponding to the remitter, and the public key P_i corresponding to the masked participant i, and the pseudo private key r'' and the pseudo public key P''_j that are corresponding to the remitter, and the pseudo public key P''_i corresponding to the masked participant i do not need to be used. In this case, if the LSAG signature is verified, it can prove that the LSAG signature is obtained through signing by using a private key corresponding to a certain public key in public keys (P_1, ..., P_n). Therefore, identity verification is completed without exposing the identity of the remitter.

The LSAG signature can be generated by the remitter based on the private key x_j, the public key P_j, the pseudo private key r'', and the pseudo public key P''_j that are corresponding to the remitter, and the public key P_i and the pseudo public key P''_i that are corresponding to the masked participant i. The pseudo public key P''_j=[PC(t_j_1, r_j_1)+ ... +PC(t_j_m, r_j_m)]−[PC(t'_1, r'_1)+ ... +PC(t'_u, r'_u)], and the pseudo private key r''=(r_j_1+ ... +r_j_m)−(r'_1+ ... +r'_u). In addition, based on the assets [ID_i_1, PC{i, 1}]...[ID_i_m, PC{i, m}] held by the masked participant i, the remitter can calculate the pseudo public key P''_i=[PC{i, 1}+ ... +PC{i, m}]−[PC(t'_1, r'_1)+ ... +PC(t'_u, r'_u)] corresponding to the masked participant i, where i∈[1, j−1]∪[j+1, n]. For the generation process of the LSAG signature, reference can be made to the implementation shown in FIG. 5. Details are omitted here for simplicity. By verifying the LSAG signature, the blockchain node can efficiently and compactly implement the following two verification functions: On one hand, because the pseudo public key P''_j and the pseudo private key r'' satisfy P''_j=r''×G, and the pseudo public key P''_i and the pseudo private key r'' satisfy P''_i≠r''×G, when the LSAG signature is generated based on the pseudo private key r'' and the pseudo public keys P''_j and P''_i, if the LSAG signature is verified, it can prove that a value of a certain pseudo public key in pseudo public keys (P''_1, ..., P''_n) is equal to r''×G. In addition, the pseudo public key corresponds to t''=0, so input and output amounts of the remittance transaction M can be equal. On the other hand, when the LSAG signature is generated based on the private key x_j and the public key P_j that are corresponding to the remitter, and the public key P_i corresponding to the masked participant i, if the LSAG signature is verified, it can prove that the LSAG signature is obtained through signing by using a private key corresponding to a certain public key in public keys (P_1, ..., P_n). Therefore, identity verification is completed without exposing the identity of the remitter.

Step 606: Execute the remittance transaction M when a transaction execution condition is met, where the transaction execution condition includes: the key-images I_1–I_m do not belong to a historical key-image set, and the LSAG signature is verified, where the key-images I_1–I_m are added to the historical key-image set after the transaction is completed.

The LSAG signature can further include a key-image I_(m+1), where the key-image is generated by the remitter based on the pseudo private key r'' and the pseudo public key P''_j that are corresponding to the remitter, and the pseudo public key P''_i corresponding to the masked participant i, for example, I_(m+1)=r''×Hash_G(P''_j). As described above, there is a one-to-one correspondence between the key-image I_(m+1) and a corresponding transaction. Therefore, the key-image I_(m+1) is compared with the historical key-image to identify a replay problem against the remittance transaction M: If the key-image I_(m+1) has the same historical key-image, it indicates that the remittance transaction M is replayed. Then, the transaction execution condition can further include: The key-image I_(m+1) does not belong to the historical key-image set.

When the remitter corresponds to the public key P_j and the masked participant i corresponds to the public key P_i, the transaction execution condition can further include: An asset ID_k_d belongs to a holder of a public key P_k, where k∈[1, n] and d∈[1, m]. In other words, the blockchain node can verify the ownership of each asset.

In a confidential transaction, the blockchain node can also verify whether none of the transfer amounts t'_1–t'_u in the remittance transaction M is less than 0. The transfer amount commitments PC(t'_1, r'_1)–PC(t'_u, r'_u) are generated by the remitter based on the transfer amounts t'_1–t'_u and the random numbers r'_1–r'_u. The transfer amounts t'_1–t'_u and the random numbers r'_1–r'_u are held only by the remitter and the remittees Q_1–Q_u. Therefore, a verifier needs to use range proofs RP_1–RP_u included in the remittance transaction to implement verification operations, so as to determine whether the transfer amounts t'_1–t'_u satisfy t'_1≥0–t'_u≥0, where the range proofs RP_1–RP_u are generated by the remitter and added to the transfer transaction M. Then, the transaction execution condition can further include: None of the transfer amounts is less than 0.

Figure 7:
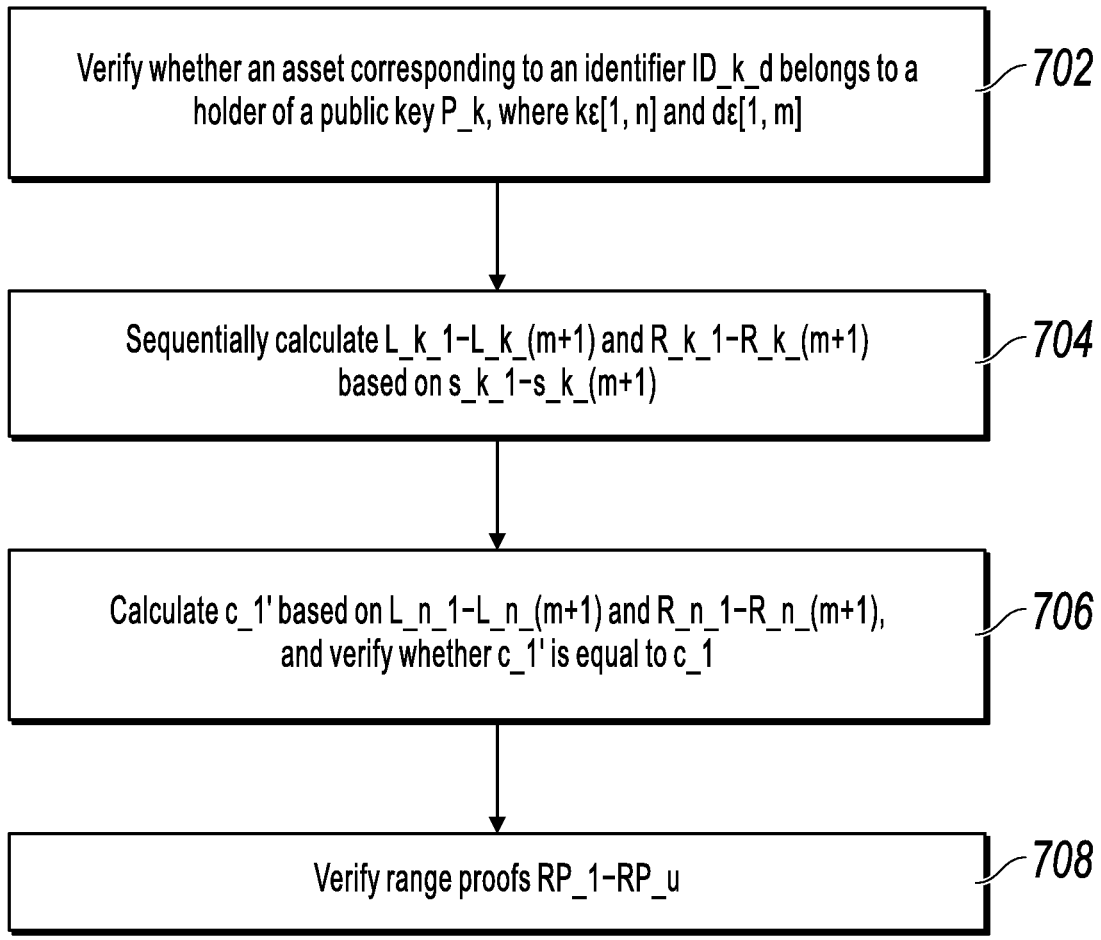
FIG. 7 is a flowchart of verifying an LSAG signature, according to an example implementation.

The following describes a process of verifying the LSAG signature in step 604*b* with reference to FIG. 7. FIG. 7 is a flowchart of verifying an LSAG signature, according to an example implementation. As shown in FIG. 7, the following steps can be included:

Step 702: Verify whether an asset corresponding to an identifier ID_k_d belongs to a holder of a public key P_k, where k∈[1, n] and d∈[1, m].

A verifier can be a blockchain node in a blockchain network. After receiving a remittance transaction M submitted by a remitter, the blockchain node can verify a ring signature of the remittance transaction M. Similarly, each blockchain node receives the remittance transaction M and implements verification as a verifier. The remittance transaction M can be sent by a client device to the verifier, or the remittance transaction M can be forwarded by one verifier to another verifier after receiving it from the client device, or the remittance transaction M can be forwarded by one verifier to other verifiers after receiving it from another verifier.

As a blockchain node, the verifier maintains the entire blockchain ledger, so the verifier can know about asset holdings of each user. The remittance transaction M involves the asset ID_k_d held by user k (corresponding to the public key P_k), and the verifier can separately verify, based on the maintained asset holdings, whether a correspondence between each public key P_k and the corresponding asset ID_k_d is established, that is, whether the holder of the public key P_k has m assets corresponding to the identifier ID_k_d. If a correspondence between each public key P_k and an identifier ID_k_d in a corresponding array is valid, subsequent steps can be continued. If an asset corresponding to a certain identifier does not belong to the holder of the public key P_k, the verifier can determine that the remittance transaction M is invalid and does not need to perform subsequent steps 704 to 708.

Step 704: Sequentially calculate L_k_1–L_k_(m+1) and R_k_1–R_k_(m+1) based on s_k_1–s_k_(m+1).

Step 706: Calculate c_1' based on L_n 1L n_(m+1) and R_n_1–R_n_(m+1), and verify whether c_1' is equal to c_1.

Based on random numbers included in the ring signature and/or derived values of the random numbers, the verifier can calculate intermediate parameters L_j_d, R_j_d, L_j_(m+1), R_j_(m+1), L_i_d, R_i_d, L_i_(m+1), and R_i_(m+1), and verify whether the intermediate parameters L_j_d and L_i_d are in compliance with a ring value determining rule, whether the intermediate parameters L_j_(m+1) and L_i_(m+1) are in compliance with the ring value determining rule, whether the intermediate parameters R_j_d and R_i_d are in compliance with the ring value determining rule, and whether the intermediate parameters R_j_(m+1) and R_i_(m+1) are in compliance with the ring value determining rule.

For example, when the random numbers and/or the derived values of the random numbers included in the ring signature include s_1_1–s_1_(m+1), ..., s_n_1–s_n_(m+1) and c_1, the ring value determining rule between the intermediate parameters L_j_d and L_i_d can include:

$$L\_k\_d = (s\_k\_d \times G + c\_k \times P\_k) \bmod p, h \in [1, n]$$

$$c\_k = \begin{cases} Hash[M, L\_n\_1, R\_n\_1, \ldots, L\_n\_(m+1), R\_n\_(m+1)], k = 1 \\ Hash[M, L\_(j-1)\_1, R\_(j-1)\_1, \ldots, L\_(j-1)\_(m+1), \\ R\_(j-1)\_(m+1)], k \in [2, n] \end{cases}$$

The ring value determining rule between the intermediate parameters L_j_(m+1) and L_i_(m+1) includes:

$$L\_k\_(m+1) = [s\_k\_(m+1) \times G + c\_k \times P'''\_k] \bmod p$$

The ring value determining rule between the intermediate parameter R_j_d and Rid includes:

$$R\_k\_d = [s\_k\_d \times Hash\_G(P\_k, ID\_k\_d) + c\_k \times I\_d] \bmod p$$

The ring value determining rule between the intermediate parameters R_j_(m+1) and R_i_(m+1) includes:

$$R\_k\_(m+1) = [s\_k\_(m+1) \times Hash\_G(P'''\_k) + c\_k \times I\_(m+1)] \bmod p$$

Then, the verifier can first generate L_1_d, that is, L_1_1-L_1_m, based on s_1_d, c_1, G, P_1, and p, and generate R_1_d, that is, R_1_1-R_1_m, based on s_1_d, c_1, P_1, ID_1_d, I_d, and p. The verifier generates L_1_(m+1) based on s_1 (m+1), c_1, G, P"_1, and p, and generates R_1_(m+1) based on s_1 (m+1), c_1, P"_1, I_(m+1), and p.

Then, the verifier can generate c_2 based on M, L_1_d, R_1_d, L_1_(m+1), and R_1_(m+1), generate L_2_d based on s_2_d, c_2, G, P_2, and p, generate R_2_d based on s_2_d, c_2, P_2, ID_2_d, I_d, and p, generate L 2 (m+1) based on s_2 (m+1), c_2, G, P"_2, and p, and generate R_2_(m+1) based on s_2_(m+1), c_2, P"_2, I_(m+1), and p; by analogy, until the verifier generates c_n based on M, L_(n−1) d, R_(n−1) d, L_(n−1)_(m+1), and R_(n−1)_(m+1), generates L_n_d based on s_n_d, c_n, G, P_n, and p, generates R_n_d based on s_n_d, c_n, P_n, ID_n_d, I_d, and p, generates L_n_(m+1) based on s_n_(m+1), c_n, G, P"_n, and p, and generates R_n_(m+1) based on s_n_(m+1), c_n, P"_n, I_(m+1), and p.

Further, the verifier can calculate c_1'=Hash[M, L_n_1, R_n_1, ..., L_n_(m+1), R_n_(m+1)] based on the previous calculation equation for c_k. Here c_1' is used to distinguish from c_1 included in the ring signature. In this case, the verifier can compare c_1' with c_1 included in the ring signature: If c_1' is equal to c_1, it indicates that the previous ring value determining rule is met, it can be determined that: 1) in pseudo public keys P_1–P_n, a pseudo public key enables a transfer-in amount of the remittance transaction M to be equal to a transfer-out amount; (2) the ring signature is generated by using a private key corresponding to a certain public key in public keys P_1–P_m. If c_1' is not equal to c_1, it indicates that at least one of 1) and 2) is not valid, the remittance transaction M is determined as invalid, and the following step 708 does not need to be continued.

Step 708: Verify range proofs RP_1–RP_u.

The verifier obtains and verifies the range proofs RP_1–RP_u from transaction content of the remittance transaction M to determine whether none of corresponding transfer amounts t'_1–t'_u is less than 0. If none of the corresponding transfer amounts t'_1–t'_u is less than 0, go to step 710; otherwise, the remittance transaction M is determined as invalid, and the following step 710 does not need to be performed.

Step 710: Verify whether key-images I_1–I_(m+1) already exist.

In an implementation, the verifier can compare the key-images I_1–I_(m+1) with historical key-images, so as to determine whether the key-images I_1–I_(m+1) already exist. If any one of the key-images I_1–I_(m+1) has a corresponding historical key-image, it can be determined that the remittance transaction M is invalid. If none of the key-images I_1–I_(m+1) has a corresponding historical key-image, it can be determined that the remittance transaction M is valid, that is, the remittance transaction M can be executed, and the remittance operation can be completed.

Figure 8:
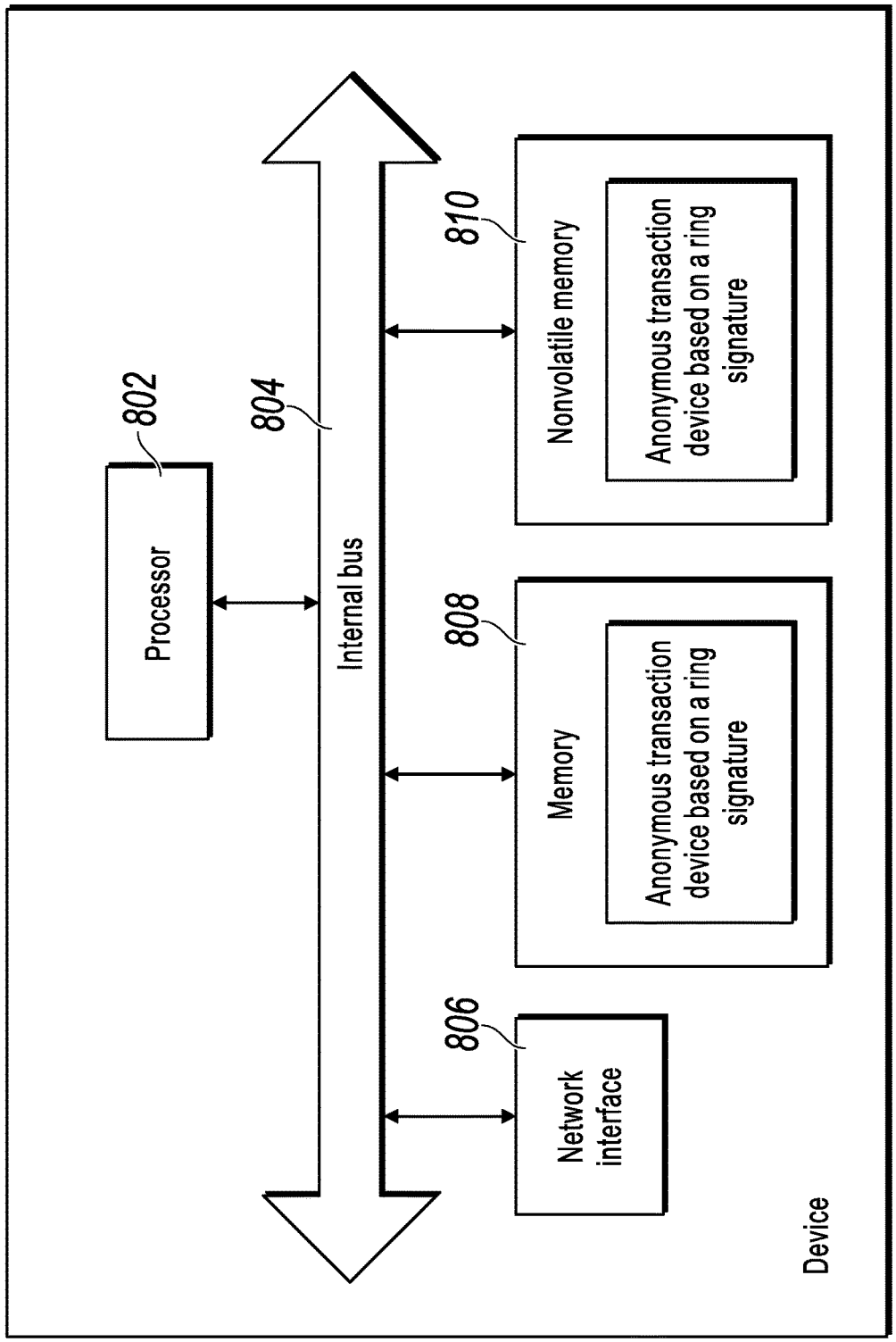
FIG. 8 is a schematic structural diagram illustrating a device, according to an example implementation.

FIG. 8 is a schematic structural diagram illustrating a device, according to an example implementation. Referring to FIG. 8, in terms of hardware, the device includes a processor 802, an internal bus 804, a network interface 806, a memory 808, and a non-volatile memory 810, and certainly can further include hardware needed by other services. The processor 802 reads a corresponding computer program from the non-volatile memory 810 to the memory 808, and then runs the computer program to logically form an anonymous transaction device based on a ring signature. Certainly, in addition to a software implementation, one or more implementations of the present specification do not exclude other implementations, for example, a logic device or a combination of hardware and software. That is, an execution body of the following processing procedure is not limited to each logical unit, and can also be hardware or a logic device.

Figure 9:
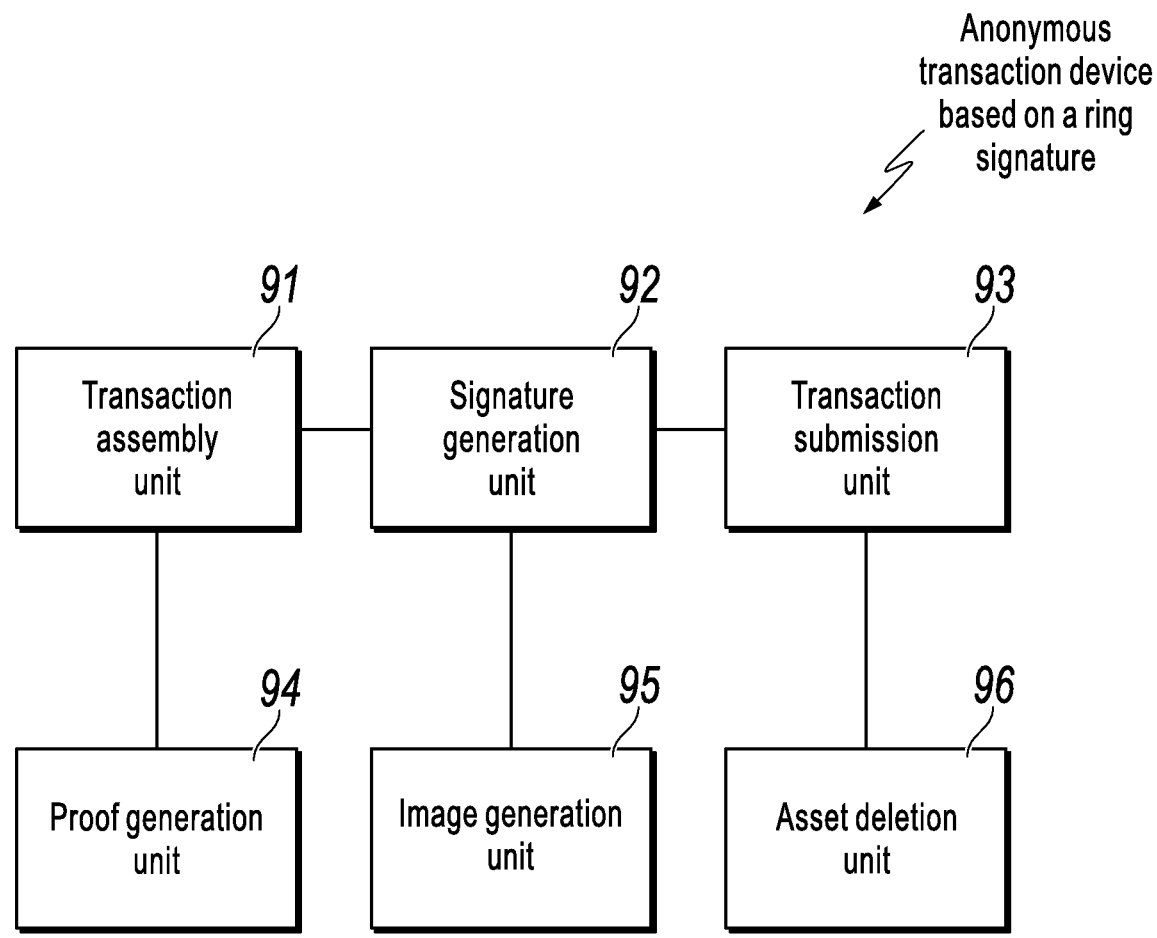
FIG. 9 is a block diagram illustrating an anonymous transaction device based on a ring signature, according to an example implementation.

Referring to FIG. 9, in a software implementation, the anonymous transaction device based on a ring signature can include: a transaction assembly unit 91, configured to assemble a remittance transaction M based on unspent assets ID_j_1–ID_j_m in an account corresponding to a remitter and masked assets ID_i_1–ID_i_m in an account corresponding to a masked participant i, where the unspent assets ID_j_1–ID_j_m and the masked assets ID_i_1–ID_i_m are respectively recorded in a blockchain ledger as asset commitments corresponding to corresponding asset amounts; a signature generation unit 92, configured to generate an LSAG signature for the remittance transaction M based on a private key $x\_j$ and a public key $P\_j$ that are held by the remitter, and a public key $P\_i$ held by the masked participant i, where the LSAG signature includes key-images $I\_1-I\_m$, and values of the key-images $I\_1-I\_m$ are related to the private key $x\_j$, the public key $P\_j$, and asset identifiers $ID\_j\_1-ID\_j\_m$ of the remitter; and a transaction submission unit 93, configured to submit a signed remittance transaction M to a blockchain network, where after the transaction is completed, the key-images $I\_1-I\_m$ are added to a historical key-image set, and the unspent assets $ID\_j\_1-ID\_j\_m$ are kept in the blockchain ledger as assets held by the remitter.

Optionally, the key-images $I\_1-I\_m$ are calculated by using the following equation: $I\_d=x\_j \times Hash\_G(P\_j, ID\_j\_d)$, $d \in [1, m]$; where $Hash\_G(\ )$ is a hash function from elliptic-curve signature to itself.

Optionally, the masked participant includes any one or a combination of: an actual remittee of the remittance transaction M, and another user different from the remitter and the actual remittee.

Optionally, when no change exists, a transaction remittee of the remittance transaction M is an actual remittee; and when a change exists, the transaction remittee of the remittance transaction M is the remitter and the actual remittee; or the transaction remittee includes the actual remittee and the remitter; and when no change exists, a transfer amount corresponding to the remitter is 0; or the transaction remittee includes the actual remittee, the remitter, and the masked participant different from the actual remittee and the remitter; when no change exists, transfer amounts corresponding to the remitter and the masked participant serving as the transaction remittee are 0; and when a change exists, the transfer amount corresponding to the remitter is a change amount, and a transfer amount corresponding to the masked participant serving as the transaction remittee is 0.

Optionally, the device further includes: a proof generation unit 94, configured to: for a transfer amount corresponding to each transaction remittee of the remittance transaction M, generate a corresponding range proof, where the range proof is assembled into the remittance transaction M to prove that the corresponding transfer amount is not less than 0.

Optionally, the unspent assets $ID\_j\_1-ID\_j\_m$ and the assets $ID\_i\_1-ID\_i\_m$ are transaction outputs of corresponding historical transactions; or the unspent assets $ID\_j\_1-ID\_j\_m$ are generated by dividing an account balance corresponding to the remitter, and the assets $ID\_i\_1-ID\_i\_m$ are generated by dividing an account balance corresponding to the masked participant i.

Optionally, the signature generation unit 92 is specifically configured to: determine a pseudo public key corresponding to the remitter: $P''\_j=[PC(t\_j\_1, r\_j\_1)+ \ldots +PC(t\_j\_m, r\_j\_m)][PC(t'\_1, r'\_1)+ \ldots +PC(t'\_u, r'\_u)]$ and a pseudo private key corresponding to the remitter: $r''=(r\_j\_1+ \ldots +r\_j\_m)-(r'1+ \ldots +r'\_u)$, where $u \geq 1$, based on asset amounts $t\_j\_1-t\_j\_m$, random numbers $r\_j\_1-r\_j\_m$, and asset commitments $PC(t\_j\_1, r\_j\_1)-PC(t\_j\_m, r\_j\_m)$ that are corresponding to the unspent assets $ID\_j\_1-ID\_j\_m$, and transfer amounts $t'\_1-t'\_u$, random numbers $r'\_1-r'\_u$, and transfer amount commitments $PC(t'\_1, r'\_1)-PC(t'\_u, r'\_u)$ that are corresponding to transaction remittees $Q\_1-Q\_u$; determine a pseudo public key corresponding to the masked participant i: $P''\_1-I+ \ldots +PC\{i, m\}[PC(t'\_1, r'\_1)+ \ldots +PC(t'\_u, r'\_u)]$, $i \in [1, j-1]U[j+1, n]$ based on asset commitments $PC\{i, 1\}-PC\{i, m\}$ corresponding to the masked assets $ID\_i\_1-ID\_i\_m$; and generate the LSAG signature for the remittance transaction M based on the private key $x\_j$, the public key $P\_j$, the pseudo private key $r''$, and the pseudo public key $P'''\_j$ that are corresponding to the remitter, and the public key $P\_i$ and the pseudo public key $P'''\_i$ that are corresponding to the masked participant i.

Optionally, the device further includes: an image generation unit 95, configured to generate a key-image $I\_(m+1)=r'' \times Hash\_G(P'''\_j)$ based on the pseudo private key $r''$ and the pseudo public key $P'''\_j$ that are corresponding to the remitter, where the LSAG signature further includes the key-image $I\_(m+1)$.

Optionally, the signature generation unit 92 is specifically configured to: separately generate intermediate parameters $L\_j\_d, R\_j\_d, L\_j\_(m+1)$, and $R\_j\_(m+1)$ that are corresponding to the remitter, and intermediate parameters $L\_i\_d, R\_i\_d, L\_i\_(m+1)$, and $R\_i\_(m+1)$ that are corresponding to the masked participant i, $d \in [1, m]$, where intermediate parameters $L\_j\_d$ and $L\_i\_d$ are in compliance with a ring value determining rule, intermediate parameters $L\_j\_(m+1)$ and $L\_i\_(m+1)$ are in compliance with the ring value determining rule, intermediate parameters $R\_j\_d$ and $R\_i\_d$ are in compliance with the ring value determining rule, intermediate parameter $R\_j\_(m+1)$ and $R\_i\_(m+1)$ are in compliance with the ring value determining rule, and values of intermediate parameters $L\_j\_d, R\_j\_d, L\_j\_(m+1), R\_j\_(m+1), L\_i\_d, R\_i\_d, L\_i\_(m+1)$, and $R\_i\_(m+1)$ are related to at least one selected random number and/or a derived value of the random number; and generate the LSAG signature for the remittance transaction M based on the selected random number and/or the derived value of the random number.

Optionally, $P\_j=x\_j \times G$, G is a base point of elliptic-curve signature, $|G|=p$ and p is a prime, and $0<x\_j<p$; generating intermediate parameters $L\_j\_d$ and $R\_j\_d$ that are corresponding to the remitter includes: calculating the intermediate parameters $L\_j\_d$ and $R\_j\_d$ based on a random number $a\_d$ selected from a number field $Z\_q$ in which the elliptic-curve signature is located, so $L\_j\_d=a\_d \times G$ and $R\_j\_d=a\_d \times Hash\_G(P\_j, ID\_j\_d)$, where $Hash\_G(\ )$ is a hash function from the elliptic-curve signature to itself; generating intermediate parameters $L\_j\_(m+1)$ and $R\_j\_(m+1)$ that are corresponding to the remitter includes: calculating the intermediate parameters $L\_j\_(m+1)$ and $R\_j\_(m+1)$ based on a random number $a\_(m+1)$ selected from the number field $Z\_q$ in which the elliptic-curve signature is located, so $L\_j\_(m+1)=a\_(m+1) \times G$ and $R\_j\_(m+1)=a\_(m+1) \times Hash\_G(P'''\_j)$; generating intermediate parameters $L\_i\_d, R\_i\_d, L\_i\_(m+1)$, and $R\_i\_(m+1)$ that are corresponding to the masked participant i includes: generating the intermediate parameters $L\_i\_d, R\_i\_d, L\_i\_(m+1)$, and $R\_i\_(m+1)$ based on values of intermediate parameters $L\_j\_d$ and $R\_j\_d$, so $L\_i\_d=(s\_i\_d \times G+c\_i \times P\_i) \mod p$, $R\_i\_d=(s\_i\_d \times Hash\_G(P\_i, ID\_i\_d)+c\_i \times I\_d) \mod p$, $L\_i\_(m+1)=[s\_i\_(m+1) \times G+c\_i \times P'''\_i] \mod p$, $R\_i\_(m+1)=[s\_i\_(m+1) \times Hash\_G(P'''\_i)+c\_i \times I\_(m+1)] \mod p$, $I\_d=x\_j \times Hash\_G(P\_j, ID\_j\_d)$, and $I\_(m+1)=r'' \times Hash\_G(P'''\_j)$, where $s\_i\_1-s\_i\_(m+1)$ are random numbers in the number field $Z\_q$; when $i=1$, $c\_1=Hash(M, L\_n\_1, R\_n\_1, \ldots, L\_n\_(m+1), R\_n\_(m+1))$; and when $i \in [2, j-1]U[j+1, n]$, $c\_i=Hash(M, L\_(i-1)\_1, R\_(i-1)\_1, \ldots, L\_(i-1)\_(m+1), R\_(i-1)\_(m+1))$, where $Hash(\ )$ is a hash function from the elliptic-curve signature to the number field $Z\_q$; and the selected random number and/or the derived value of the random number include: random numbers $s\_i\_1-s\_i\_(m+1)$, a derived value $c\_1$, and derived values $s\_j\_1-s\_j\_(m+1)$, where $s\_j\_d=(a\_d-c\_j \times x\_j) \mod p$ and $s\_j\_(m+1)=[a\_(m+1)-c\_j \times r''] \mod p$; when the value of j is determined as 1, $c\_j=Hash(M, L\_n\_1, R\_n\_1, \ldots, L\_n\_(m+1), R\_n\_(m+1))$; and when the value of j is determined to belong to [2, n], $c\_j=\text{Hash}(M, L\_(j-1)\_1, R\_(j-1)\_1, \ldots, L\_(j-1)\_(m+1), R\_(j-1)\_(m+1))$.

Optionally, the device further includes: an asset deletion unit 96, configured to initiate an asset deletion request to the blockchain network to delete at least a portion of assets that the remitter has spent from the blockchain ledger.

Figure 10:
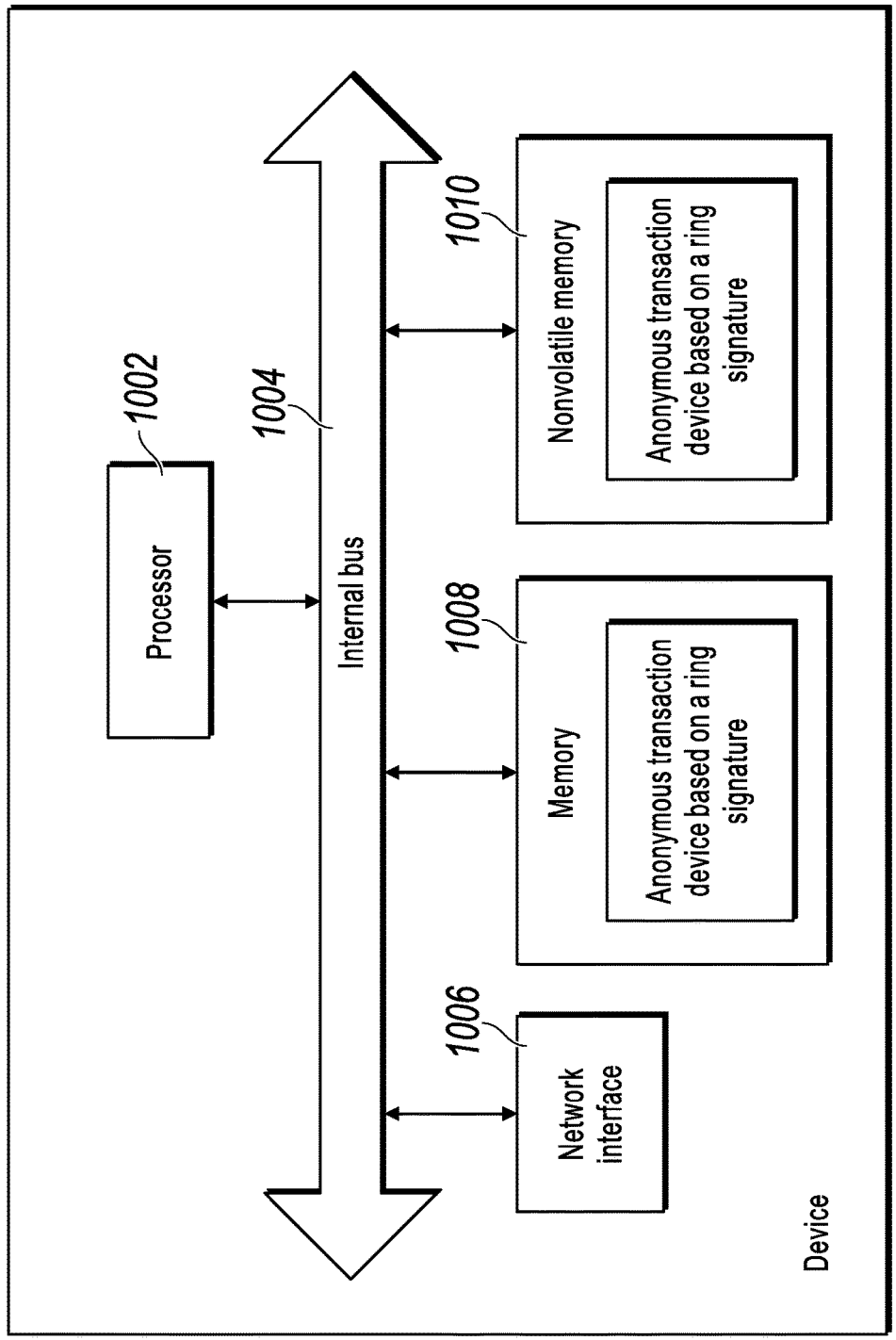
FIG. 10 is a schematic structural diagram illustrating another device, according to an example implementation.

FIG. 10 is a schematic structural diagram illustrating a device, according to an example implementation. Referring to FIG. 10, in terms of hardware, the device includes a processor 1002, an internal bus 1004, a network interface 1006, a memory 1008, and a non-volatile memory 1010, and certainly can further include hardware needed by other services. The processor 1002 reads a corresponding computer program from the non-volatile memory 1010 to the memory 1008, and then runs the computer program to logically form an anonymous transaction device based on a ring signature. Certainly, in addition to a software implementation, one or more implementations of the present specification do not exclude other implementations, for example, a logic device or a combination of hardware and software. That is, an execution body of the following processing procedure is not limited to each logical unit, and can also be hardware or a logic device.

Figure 11:
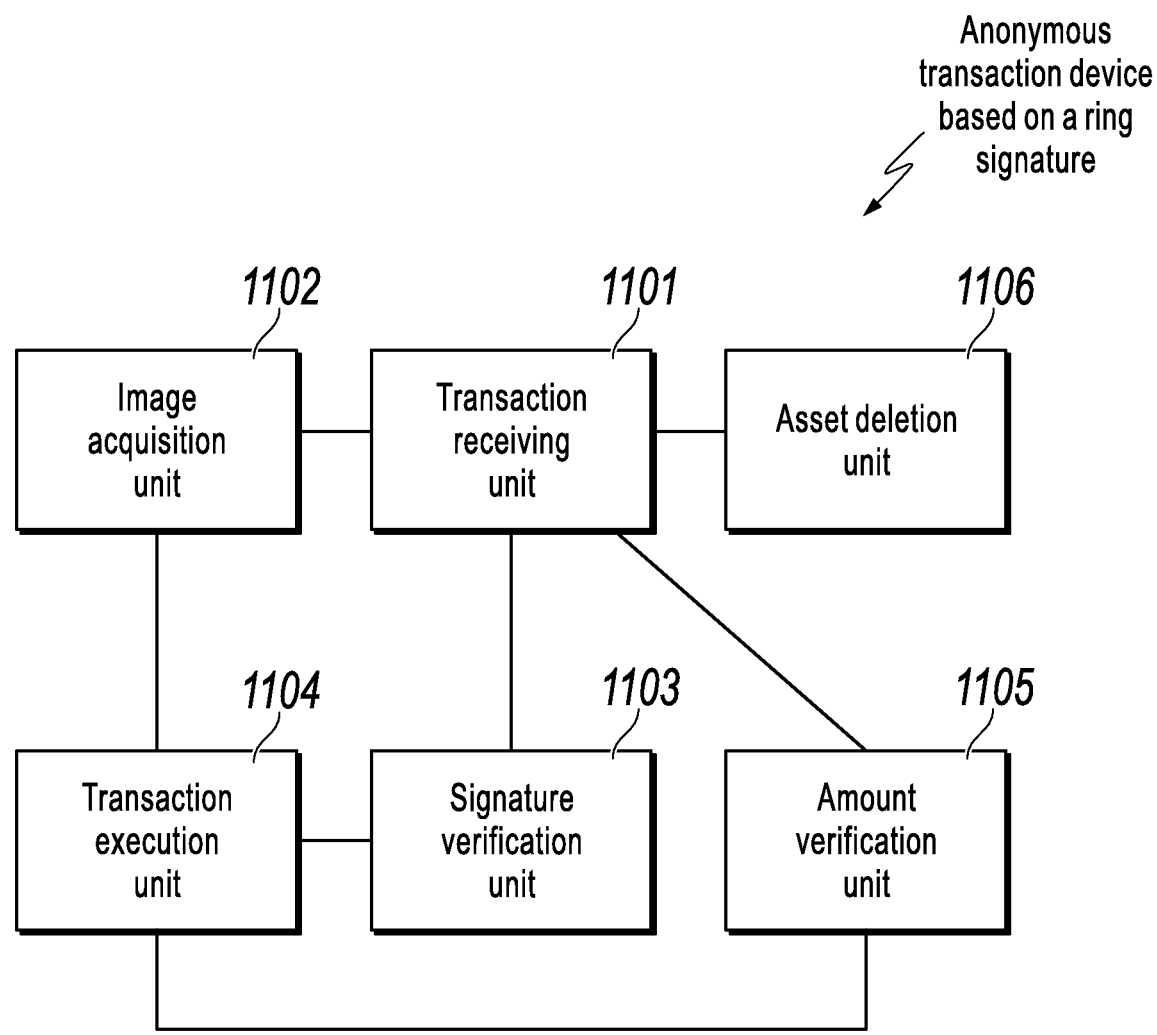
FIG. 11 is a block diagram illustrating another anonymous transaction device based on a ring signature, according to an example implementation.

Referring to FIG. 11, in a software implementation, the anonymous transaction device based on a ring signature can include: a transaction receiving unit 1101, configured to receive a remittance transaction M, where the remittance transaction M is generated by a remitter by assembling unspent assets $ID\_j\_1-ID\_j\_m$ in an account corresponding to the remitter and masked assets $ID\_i\_1-ID\_i\_m$ in an account corresponding to a masked participant i; and after the transaction is completed, the assets $ID\_j\_1-ID\_j\_m$ are kept in a blockchain ledger as assets held by the remitter; an image acquisition unit 1102, configured to obtain key-images $I\_1-I\_m$ included in an LSAG signature of the remittance transaction M, where values of the key-images $I\_1-I\_m$ are related to a private key $x\_j$, a public key $P\_j$, and asset identifiers $ID\_j\_1-ID\_j\_m$ of the remitter; a signature verification unit 1103, configured to verify the LSAG signature, where the LSAG signature is generated by the remitter based on the private key $x\_j$ and the public key $P\_j$ that are held by the remitter, and a public key $P\_i$ held by the masked participant i; and a transaction execution unit 1104, configured to execute the remittance transaction M when a transaction execution condition is met, where the transaction execution condition includes: the key-images $I\_1-I\_m$ do not belong to a historical key-image set, and the LSAG signature is verified, where the key-images $I\_1-I\_m$ are added to the historical key-image set after the transaction is completed.

Optionally, the key-images $I\_1-I\_m$ are calculated by the remitter by using the following equation: $I\_d=x\_j \times \text{Hash}\_G(P\_j, ID\_j\_d)$, $d \in [1, m]$; where $\text{Hash}\_G(\ )$ is a hash function from elliptic-curve signature to itself.

Optionally, the masked participant includes any one or a combination of: an actual remittee of the remittance transaction M, and another user different from the remitter and the actual remittee.

Optionally, when no change exists, a transaction remittee of the remittance transaction M is an actual remittee; and when a change exists, the transaction remittee of the remittance transaction M is the remitter and the actual remittee; or the transaction remittee includes the actual remittee and the remitter; and when no change exists, a transfer amount corresponding to the remitter is 0; or the transaction remittee includes the actual remittee, the remitter, and the masked participant different from the actual remittee and the remitter; when no change exists, transfer amounts corresponding to the remitter and the masked participant serving as the transaction remittee are 0; and when a change exists, the transfer amount corresponding to the remitter is a change amount and a transfer amount corresponding to the masked participant serving as the transaction remittee is 0.

Optionally, the device further includes: an amount verification unit 1105, configured to verify whether a transfer amount corresponding to each transaction remittee is not less than 0 based on a range proof included in the remittance transaction M, where the transaction execution condition further includes: the transfer amount corresponding to each transaction remittee is not less than 0.

Optionally, the unspent assets $ID\_j\_1-ID\_j\_m$ and the assets $ID\_i\_1-ID\_i\_m$ are transaction outputs of corresponding historical transactions; or the unspent assets $ID\_j\_1-ID\_j\_m$ are generated by dividing an account balance corresponding to the remitter, and the assets $ID\_i\_1-ID\_i\_m$ are generated by dividing an account balance corresponding to the masked participant i.

Optionally, the transaction execution condition further includes: an asset $ID\_k\_d$ belongs to a holder of a public key $P\_k$, where $k \in [1, n]$, $d \in [1, m]$, and $i \in [1, j-1] \cup [j+1, n]$.

Optionally, the LSAG signature is generated by the remitter based on the private key $x\_j$, the public key $P\_j$, a pseudo private key $r''$, and a pseudo public key $P'''\_j$ that are corresponding to the remitter, and the public key $P\_i$ and a pseudo public key $P'''\_i$ that are corresponding to the masked participant i, so when the LSAG signature is verified, it is confirmed that input and output amounts of the remittance transaction M are equal; where the pseudo public key $P'''\_j=[PC(t\_j\_1, r\_j\_1)+ \ldots +PC(t\_j\_m, r\_j\_m)]-[PC(t'\_1, r'\_1)+ \ldots +PC(t'\_u, r'\_u)]$, the pseudo private key $r''=(r\_j\_1+ \ldots +r\_j\_m)-(r'\_1+ \ldots +r'\_u)$, the pseudo public key $P'''\_i=[PC\{i, 1\}+ \ldots +PC\{i, m\}]-[PC(t'\_1, r'\_1)+ \ldots +PC(t'\_u, r'\_u)]$, $i \in [1, j-1] \cup [j+1, n]$, where asset identifiers $ID\_j\_1-ID\_j\_m$ correspond to asset amounts $t\_j\_1-t\_j\_m$, random numbers $r\_j\_1-r\_j\_m$, and asset commitments $PC(t\_j\_1, r\_j\_1)-PC(t\_j\_m, r\_j\_m)$; the masked assets $ID\_i\_1-ID\_i\_m$ correspond to asset commitments $PC\{i, 1\}PC\{i, m\}$; transaction remittees $Q\_1-Q\_u$ correspond to transfer amounts $t'\_1-t'\_u$, random numbers $r'\_1$ $r'\_u$, and transfer amount commitments $PC(t'\_1, r'\_1)-PC(t'\_u, r'\_u)$, where $u \geq 1$.

Optionally, the LSAG signature further includes a key-image $I\_(m+1)=r'' \times \text{Hash}\_G(P'''\_j)$; and the transaction execution condition further includes: the key-image $I\_(m+1)$ does not belong to the historical key-image set.

Optionally, the remitter separately generates intermediate parameters $L\_j\_d$, $R\_j\_d$, $L\_j\_(m+1)$, and $R\_j\_(m+1)$ that are corresponding to the remitter based on the private key $x\_j$, the public key $P\_j$, the pseudo private key $r''$, and the pseudo public key $P'''\_j$ that are corresponding to the remitter, and the public key $P\_i$ and the pseudo public key $P'''\_i$ that are corresponding to the masked participant i; generates intermediate parameters $L\_i\_d$, $R\_i\_d$, $L\_i\_(m+1)$, and $R\_i\_(m+1)$ that are corresponding to the masked participant i; and generates the LSAG signature based on random numbers related to values of the intermediate parameters $L\_j\_d$, $R\_j\_d$, $L\_j\_(m+1)$, $R\_j\_(m+1)$, $L\_i\_d$, $R\_i\_d$, $L\_i\_(m+1)$, and $R\_i\_(m+1)$ and/or derived values of the random numbers, where $d \in [1, m]$; and verifying the LSAG signature includes: based on the random numbers and/or the derived values of the random numbers included in the ring signature, calculating the intermediate parameters $L\_j\_d$, $R\_j\_d$, $L\_j\_(m+1)$, $R\_j\_(m+1)$, $L\_i\_d$, $R\_i\_d$, $L\_i\_(m+1)$, and $R\_i\_(m+1)$, and verifying whether the intermediate parameters $L\_j\_d$ and $L\_i\_d$ are in compliance with a ring value determining rule, whether the intermediate parameters $L\_j\_(m+1)$ and $L\_i\_(m+1)$ are in compliance with the ring value determining rule, whether the intermediate parameters $R\_j\_d$ and $R\_i\_d$ are in compliance with the ring value determining rule, and whether the intermediate parameters $R\_j\_(m+1)$ and $R\_i\_(m+1)$ are in compliance with the ring value determining rule.

Optionally, $P\_j=x\_j \times G$, $G$ is a base point of elliptic-curve signature, $|G|=p$ and $p$ is a prime, and $0<x\_j<p$; the random numbers and/or the derived values of the random numbers included in the ring signature include $s\_k\_1 - s\_k\_(m+1)$ and $c\_1$, $k \in [1, n]$; the ring value determining rule between the intermediate parameters $L\_j\_d$ and $L\_i\_d$ includes: $L\_k\_d = (s\_k\_d \times G + c\_k \times P\_k) \bmod p$, where $s\_k\_d$ belongs to a number field $Z\_q$ in which the elliptic-curve signature is located, and Hash( ) is a hash function from the elliptic-curve signature to the number field $Z\_q$; the ring value determining rule between the intermediate parameters $L\_j\_(m+1)$ and $L\_i\_(m+1)$ includes: $L\_k\_(m+1) = [s\_k\_(m+1) \times G + c\_k \times P''\_k] \bmod p$, where $s\_k\_(m+1)$ belongs to the number field $Z\_q$; the ring value determining rule between the intermediate parameters $R\_j\_d$ and $R\_i\_d$ includes: $R\_k\_d = (s\_k\_d \times Hash\_G(P\_k, ID\_k\_d) + c\_k \times I\_d) \bmod p$, where $I\_d$ is included in the ring signature; and the ring value determining rule between the intermediate parameters $R\_j\_(m+1)$ and $R\_i\_(m+1)$ includes: $R\_k\_(m+1) = [s\_k\_(m+1) \times Hash\_G(P''\_k) + c\_k \times I\_(m+1)] \bmod p$, where $I\_(m+1)$ is included in the ring signature; where when $h=1$, $c\_1 = Hash(M, L\_n\_1, R\_n\_1, \ldots, L\_n\_(m+1), R\_n\_(m+1))$, and when $h \in [2, n]$, $c\_k = Hash(M, L\_(h-1)\_1, R\_(h-1)\_1, \ldots, L\_(h-1)\_(m+1), R\_(h-1)\_(m+1))$.

Optionally, the device further includes: an asset deletion unit 1106, configured to delete at least a portion of assets that the remitter has spent from the blockchain ledger based on an asset deletion request initiated by remitter to the blockchain network.

The system, device, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, the computer includes one or more processors (CPU), one or more input/output interfaces, one or more network interfaces, and one or more memories.

The memory may include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD) or another optical storage, a cassette tape, a magnetic disk storage, a quantum memory, a storage medium based on grapheme, another magnetic storage device, or any other non-transmission medium. The computer storage medium can be used to store information that can be accessed by the computing device. Based on the definition in the present specification, the computer readable medium does not include transitory computer readable media (transitory media) such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or may be advantageous.

Terms used in one or more implementations of the present specification are merely used to describe specific implementations, and are not intended to limit the one or more implementations of the present specification. The terms "a" and "the" of singular forms used in one or more implementations of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. may be used in one or more implementations of the present specification to describe various types of information, the information is not limited to these terms. These terms are only used to differentiate between information of the same type. For example, without departing from the scope of one or more implementations of the present specification, first information can also be referred to as second information, and similarly, the second information can be referred to as the first information. Depending on the context, for example, the word "if" _used here can be explained as "while", "when", or "in response to determining".

The previous descriptions are only example implementations of one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A computer-implemented method for completing an anonymous transaction based on a ring signature, comprising:

assembling a remittance transaction based on unspent assets ID_j_1 to ID_j_m in an account corresponding to a remitter and masked assets ID_i_1 to ID_i_m in an account corresponding to a masked participant i, wherein the unspent assets ID_j_1 to ID_j_m and the masked assets ID_i_1 to ID_i_m are respectively recorded in a blockchain ledger as asset commitments corresponding to asset amounts;

generating a linkable spontaneous anonymous group (LSAG) signature for the remittance transaction based on a private key x_j and a public key P_j that are held by the remitter, and a public key P_i held by the masked participant i, wherein the LSAG signature comprises key-images I_1 to I_m, and values of the key-images I_1 to I_m are based on the private key x_j, the public key P_j, and asset identifiers for the unspent assets ID_j_1 to ID_j_m of the remitter; and submitting a signed remittance transaction comprising the remittance transaction and the LSAG signature to a blockchain network, wherein after the remittance transaction is completed, the key-images I_1 to I_m are added to a historical key-image set, and the unspent assets ID_j_1 to ID_j_m are kept in the blockchain ledger as assets held by the remitter.

2. The computer-implemented method of claim 1, wherein the key-images I_1 to I_m are calculated using:

$$I\_d = x\_j \times \text{Hash\_G}(P\_j, ID\_j\_d), d \in [1, m],$$

wherein Hash_G( ) is a hash function from an elliptic-curve signature to itself.

3. The computer-implemented method of claim 1, wherein the masked participant i comprises one or more of (i) an actual remittee of the remittance transaction or (ii) another user different from the remitter and the actual remittee.

4. The computer-implemented method of claim 1, wherein:

when no change is due to the remitter after the remittance transaction, a transaction remittee of the remittance transaction is an actual remittee and when change is due to the remitter after the remittance transaction, the transaction remittee of the remittance transaction is the remitter and the actual remittee; or the transaction remittee comprises the actual remittee and the remitter; and when no change is due to the remitter after the remittance transaction, a transfer amount corresponding to the remitter is zero; or the transaction remittee comprises the actual remittee, the remitter, and the masked participant i different from the actual remittee and the remitter; when no change is due to the remitter after the remittance transaction, transfer amounts corresponding to the remitter and the masked participant i serving as the transaction remittee are zero; and when change is due to the remitter after the remittance transaction, the transfer amount corresponding to the remitter is a change amount and a transfer amount corresponding to the masked participant i serving as the transaction remittee is zero.

5. The computer-implemented method of claim 1, further comprising:

for a transfer amount corresponding to each transaction remittee of the remittance transaction, generating a corresponding range proof, wherein the corresponding range proof is assembled into the remittance transaction to prove that the transfer amount is not less than zero.

6. The computer-implemented method of claim 1, wherein:

the unspent assets ID_j_1 to ID_j_m and the masked assets ID_i_1 to ID_i_m are transaction outputs of corresponding historical transactions; or the unspent assets ID_j_1 to ID_j_m are generated by dividing an account balance corresponding to the remitter, and the masked assets ID_i_1 to ID_i_m are generated by dividing an account balance corresponding to the masked participant i.

7. The computer-implemented method of claim 1, wherein generating the LSAG signature for the remittance transaction based on the private key x_j and the public key P_j that are held by the remitter, and the public key P_i held by the masked participant i comprises:

determining a pseudo public key P'''_j=[PC(t_j_1, r_j_1)+ . . . +PC(t_j_m, r_j_m)]−[PC(t'_1, r'_1)+ . . . +PC(t'_u, r'_u)] corresponding to the remitter and a pseudo private key r'''=(r_j_1+ . . . +r_j_m)−(r'_1+ . . . +r'_u) corresponding to the remitter, wherein u≥1, based on asset amounts t_j_1 to t_j_m, random numbers r_j_1 to r_j_m, and asset commitments PC(t_j_1, r_j_1) to PC(t_j_m, r_j_m) that correspond to the unspent assets ID_j_1 to ID_j_m, and transfer amounts t'_1 to t'_u, random numbers r'_1 to r'_u, and transfer amount commitments PC(t'_1, r'_1) to PC(t'_u, r'_u) that correspond to transaction remittees Q_1 to Q_u;

determining a pseudo public key P'''_i=[PC{i, 1}+ . . . +PC{i, m}]−[PC(t'_1, r'_1)+ . . . +PC(t'_u, r'_u)], i∈[1, j−1]∪[j+1, n] corresponding to the masked participant i based on asset commitments PC{i, 1}−PC{i, m} corresponding to the masked assets ID_i_1 to ID_i_m; and generating the LSAG signature for the remittance transaction based on the private key x_j, the public key P_j, the pseudo private key r''', the pseudo public key P'''_j, the public key P_i, and the pseudo public key P'''_i.

8. The computer-implemented method of claim 7, further comprising:

generating a key-image I_(m+1)=e×Hash_G(P'''_j) based on the pseudo private key r''' and the pseudo public key P'''_j, wherein the LSAG signature further comprises the key-image I_(m+1).

9. The computer-implemented method of claim 7, wherein generating the LSAG signature for the remittance transaction based on the private key x_j, the public key P_j, the pseudo private key r''', the pseudo public key P'''_j, the public key P_i, and the pseudo public key P'''_i comprises:

separately generating intermediate parameters L_j_d, R_j_d, L_j_(m+1), and R_j_(m+1) corresponding to the remitter, and intermediate parameters L_i_d, R_i_d, L_i_(m+1), and R_i_(m+1) corresponding to the masked participant i, d∈[1, m], wherein the intermediate parameters L_j_d and L_i_d are in compliance with a ring value determining rule, the intermediate parameters L_j_(m+1) and L_i_(m+1) are in compliance with the ring value determining rule, the intermediate parameters R_j_d and R_i_d are in compliance with the ring value determining rule, the intermediate parameter R_j_(m+1) and R_i_(m+1) are in compliance with the ring value determining rule, and values of the intermediate parameters L_j_d, R_j_d, L_j_(m+1), R_j_(m+1), L_i_d, R_i_d, L_i_(m+1), and R_i_(m+1)

are related to at least one selected random number and/or a derived value of the at least one selected random number; and generating the LSAG signature for the remittance transaction based on the selected random number and/or the derived value of the random number.

10. The computer-implemented method of claim 9, wherein:

the public key $P\_j = x\_j \times G$, G is a base point of an elliptic-curve signature, $|G|=p$ and p is a prime number, and $0 < x\_j < p$;

generating the intermediate parameters $L\_j\_d$ and $R\_j\_d$ corresponding to the remitter comprises: calculating the intermediate parameters $L\_j\_d$ and $R\_j\_d$ based on a random number $a\_d$ selected from a number field $Z\_q$ in which the elliptic-curve signature is located, such that the intermediate parameter $L\_j\_d = a\_d \times G$ and the intermediate parameter $R\_j\_d = a\_d \times Hash\_G(P\_j, ID\_j\_d)$, wherein Hash_G( ) is a hash function from the elliptic-curve signature to itself;

generating the intermediate parameters $L\_j\_(m+1)$ and $R\_j\_(m+1)$ corresponding to the remitter comprises: calculating the intermediate parameters $L\_j\_(m+1)$ and $R\_j\_(m+1)$ based on a random number $a\_(m+1)$ selected from the number field $Z\_q$ in which the elliptic-curve signature is located, such that the intermediate parameter $L\_j\_(m+1) = a\_(m+1) \times G$ and the intermediate parameter $R\_j\_(m+1) = a\_(m+1) \times Hash\_G(P"\_j)$;

generating the intermediate parameters $L\_i\_d$, $R\_i\_d$, $L\_i\_(m+1)$, and $R\_i\_(m+1)$ corresponding to the masked participant i comprises: generating the intermediate parameters $L\_i\_d$, $R\_i\_d$, $L\_i\_(m+1)$, and $R\_i\_(m+1)$ based on values of the intermediate parameters $L\_j\_d$ and $R\_j\_d$, so the intermediate parameter $L\_i\_d = (s\_i\_d \times G + c\_i \times P\_i) \bmod p$, the intermediate parameter $R\_i\_d = (s\_i\_d \times Hash\_G(P\_i, ID\_i\_d) + c\_i \times I\_d) \bmod p$, the intermediate parameter $L\_i\_(m+1) = [s\_i\_(m+1) \times G + c\_i \times P"\_i] \bmod p$, the intermediate parameter $R\_i\_(m+1) = [s\_i\_(m+1) \times Hash\_G(P"\_i) + c\_i \times I\_(m+1)] \bmod p$, $I\_d = x\_j \times Hash\_G(P\_j, ID\_j\_d)$, and $I\_(m+1) = r" \times Hash\_G(P"\_j)$, wherein $s\_i\_1 - s\_i\_(m+1)$ are random numbers in the number field $Z\_q$; when i=1, $c\_1 = Hash(M, L\_n\_1, R\_n\_1, \ldots, L\_n\_(m+1), R\_n\_(m+1))$; and when $i \in [2, j-1] \cup [j+1, n]$, $c\_i = Hash(M, L\_(i-1)\_1, R\_(i-1)\_1, \ldots, L\_(i-1)\_(m+1), R\_(i-1)\_(m+1))$, wherein Hash( ) is a hash function from the elliptic-curve signature to the number field $Z\_q$; and the selected random number and/or the derived value of the random number comprise: the random numbers $s\_i\_1$ to $s\_i\_(m+1)$, a derived value $c\_1$, and derived values $s\_j\_1$ to $s\_j\_(m+1)$, wherein $s\_j\_d = (a\_d - c\_j \times x\_j) \bmod p$ and $s\_j\_(m+1) = [a\_(m+1) - c\_j \times r"] \bmod p$; when a value of j is determined as one, $c\_j = Hash(M, L\_n\_1, R\_n\_1, \ldots, L\_n\_(m+1), R\_n\_(m+1))$; and when the value of j is determined to belong to [2, n], $c\_j = Hash(M, L\_(j-1)\_1, R\_(j-1)\_1, \ldots, L\_(j-1)\_(m+1), R\_(j-1)\_(m+1))$.

11. The computer-implemented method of claim 1, further comprising:

initiating an asset deletion request to the blockchain network to delete at least a portion of assets that the remitter has spent from the blockchain ledger.

12. A non-transitory, computer-readable medium storing one or more instructions executable by a computer system to perform operations comprising:

assembling a remittance transaction based on unspent assets $ID\_j\_1$ to $ID\_j\_m$ in an account corresponding to a remitter and masked assets $ID\_i\_1$ to $ID\_i\_m$ in an account corresponding to a masked participant i, wherein the unspent assets $ID\_j\_1$ to $ID\_j\_m$ and the masked assets $ID\_i\_1$ to $ID\_i\_m$ are respectively recorded in a blockchain ledger as asset commitments corresponding to asset amounts;

generating a linkable spontaneous anonymous group (LSAG) signature for the remittance transaction based on a private key $x\_j$ and a public key $P\_j$ that are held by the remitter, and a public key $P\_i$ held by the masked participant i, wherein the LSAG signature comprises key-images $I\_1$ to $I\_m$, and values of the key-images $I\_1$ to $I\_m$ are based on the private key $x\_j$, the public key $P\_j$, and asset identifiers for the unspent assets $ID\_j\_1$ to $ID\_j\_m$ of the remitter; and submitting a signed remittance transaction comprising the remittance transaction and the LSAG signature to a blockchain network, wherein after the remittance transaction is completed, the key-images $I\_1$ to $I\_m$ are added to a historical key-image set, and the unspent assets $ID\_j\_1$ to $ID\_j\_m$ are kept in the blockchain ledger as assets held by the remitter.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

assembling a remittance transaction based on unspent assets $ID\_j\_1$ to $ID\_j\_m$ in an account corresponding to a remitter and masked assets $ID\_i\_1$ to $ID\_i\_m$ in an account corresponding to a masked participant i, wherein the unspent assets $ID\_j\_1$ to $ID\_j\_m$ and the masked assets $ID\_i\_1$ to $ID\_i\_m$ are respectively recorded in a blockchain ledger as asset commitments corresponding to asset amounts;

generating a linkable spontaneous anonymous group (LSAG) signature for the remittance transaction based on a private key $x\_j$ and a public key $P\_j$ that are held by the remitter, and a public key $P\_i$ held by the masked participant i, wherein the LSAG signature comprises key-images $I\_1$ to $I\_m$, and values of the key-images $I\_1$ to $I\_m$ are based on the private key $x\_j$, the public key $P\_j$, and asset identifiers for the unspent assets $ID\_j\_1$ to $ID\_j\_m$ of the remitter; and submitting a signed remittance transaction comprising the remittance transaction and the LSAG signature to a blockchain network, wherein after the remittance transaction is completed, the key-images $I\_1$ to $I\_m$ are added to a historical key-image set, and the unspent assets $ID\_j\_1$ to $ID\_j\_m$ are kept in the blockchain ledger as assets held by the remitter.

14. The computer-implemented system of claim 13, wherein the key-images $I\_1$ to $I\_m$ are calculated using:

$$I\_d = x\_j \times \text{Hash\_G}(P\_j, ID\_j\_d), d \in [1, m],$$

wherein Hash_G( ) is a hash function from an elliptic-curve signature to itself.

15. The computer-implemented system of claim 13, wherein the masked participant i comprises one or more of (i) an actual remittee of the remittance transaction or (ii) another user different from the remitter and the actual remittee.

16. The computer-implemented system of claim 13, wherein:
when no change is due to the remitter after the remittance transaction, a transaction remittee of the remittance transaction is an actual remittee and when change is due to the remitter after the remittance transaction, the transaction remittee of the remittance transaction is the remitter and the actual remittee; or
the transaction remittee comprises the actual remittee and the remitter; and when no change is due to the remitter after the remittance transaction, a transfer amount corresponding to the remitter is zero; or
the transaction remittee comprises the actual remittee, the remitter, and the masked participant i different from the actual remittee and the remitter; when no change is due to the remitter after the remittance transaction, transfer amounts corresponding to the remitter and the masked participant i serving as the transaction remittee are zero; and when change is due to the remitter after the remittance transaction, the transfer amount corresponding to the remitter is a change amount and a transfer amount corresponding to the masked participant i serving as the transaction remittee is zero.

17. The computer-implemented system of claim 13, wherein the operations comprise:
for a transfer amount corresponding to each transaction remittee of the remittance transaction, generating a corresponding range proof, wherein the corresponding range proof is assembled into the remittance transaction to prove that the transfer amount is not less than zero.

18. The computer-implemented system of claim 13, wherein:
the unspent assets $ID\_j\_1$ to $ID\_j\_m$ and the masked assets $ID\_i\_1$ to $ID\_i\_m$ are transaction outputs of corresponding historical transactions; or
the unspent assets $ID\_j\_1$ to $ID\_j\_m$ are generated by dividing an account balance corresponding to the remitter, and the masked assets $ID\_i\_1$ to $ID\_i\_m$ are generated by dividing an account balance corresponding to the masked participant i.

19. The computer-implemented system of claim 13, wherein generating the LSAG signature for the remittance transaction based on the private key $x\_j$ and the public key $P\_j$ that are held by the remitter, and the public key $P\_i$ held by the masked participant i comprises:
determining a pseudo public key $P''\_j=[PC(t\_j\_1, r\_j\_1)+ \ldots +PC(t\_j\_m, r\_j\_m)]-[PC(t'\_1, r'\_1)+ \ldots +PC(t'\_u, r'\_u)]$ corresponding to the remitter and a pseudo private key $r''=(r\_j\_1+ \ldots +r\_j\_m)-(r'\_1+ \ldots +r'\_u)$ corresponding to the remitter, wherein $u \geq 1$, based on asset amounts $t\_j\_1$ to $t\_j\_m$, random numbers $r\_j\_1$ to $r\_j\_m$, and asset commitments $PC(t\_j\_1, r\_j\_1)$ to $PC(t\_j\_m, r\_j\_m)$ that are correspond to the unspent assets $ID\_j\_1$ to $ID\_j\_m$, and transfer amounts $t'\_1$ to $t'\_u$, random numbers $r'\_1$ to $r'\_u$, and transfer amount commitments $PC(t'\_1, r'\_1)$ to $PC(t'\_u, r'\_u)$ that correspond to transaction remittees $Q\_1$ to $Q\_u$;
determining a pseudo public key $P''\_i=[PC\{i, 1\}+ \ldots +PC\{i, m\}]-[PC(t'\_1, r'\_1)+ \ldots +PC(t'\_u, r'\_u)]$, $i \in [1, j-1] \cup [j+1, n]$ corresponding to the masked participant i based on asset commitments $PC\{i, 1\}-PC\{i, m\}$ corresponding to the masked assets $ID\_i\_1$ to $ID\_i\_m$; and
generating the LSAG signature for the remittance transaction based on the private key $x\_j$, the public key $P\_j$, the pseudo private key $r''$, the pseudo public key $P''\_j$, the public key $P\_i$, and the pseudo public key $P''\_i$.

20. The computer-implemented system of claim 19, wherein the operations comprise:
generating a key-image $I\_(m+1)=r'' \times Hash\_G(P''\_j)$ based on the pseudo private key $r''$ and the pseudo public key $P''\_j$, wherein the LSAG signature further comprises the key-image $I\_(m+1)$.

21. The computer-implemented system of claim 19, wherein generating the LSAG signature for the remittance transaction based on the private key $x\_j$, the public key $P\_j$, the pseudo private key $r''$, the pseudo public key $P''\_j$, the public key $P\_i$, and the pseudo public key $P''\_i$ comprises:
separately generating intermediate parameters $L\_j\_d$, $R\_j\_d$, $L\_j\_(m+1)$, and $R\_j\_(m+1)$ corresponding to the remitter, and intermediate parameters $L\_i\_d$, $R\_i\_d$, $L\_i\_(m+1)$, and $R\_i\_(m+1)$ corresponding to the masked participant i, $d \in [1, m]$, wherein the intermediate parameters $L\_j\_d$ and $L\_i\_d$ are in compliance with a ring value determining rule, the intermediate parameters $L\_j\_(m+1)$ and $L\_i\_(m+1)$ are in compliance with the ring value determining rule, the intermediate parameters $R\_j\_d$ and $R\_i\_d$ are in compliance with the ring value determining rule, the intermediate parameter $R\_j\_(m+1)$ and $R\_i\_(m+1)$ are in compliance with the ring value determining rule, and values of the intermediate parameters $L\_j\_d$, $R\_j\_d$, $L\_j\_(m+1)$, $R\_j\_(m+1)$, $L\_i\_d$, $R\_i\_d$, $L\_i\_(m+1)$, and $R\_i\_(m+1)$ are related to at least one selected random number and/or a derived value of the at least one selected random number; and
generating the LSAG signature for the remittance transaction based on the selected random number and/or the derived value of the random number.

22. The computer-implemented system of claim 21, wherein:
the public key $P\_j=x\_j \times G$, G is a base point of an elliptic-curve signature, $|G|=p$ and p is a prime number, and $0 < x\_j < p$;
generating the intermediate parameters $L\_j\_d$ and $R\_j\_d$ corresponding to the remitter comprises: calculating the intermediate parameters $L\_j\_d$ and $R\_j\_d$ based on a random number $a\_d$ selected from a number field $Z\_q$ in which the elliptic-curve signature is located, such that the intermediate parameter $L\_j\_d=a\_d \times G$ and the intermediate parameter $R\_j\_d=a\_d \times Hash\_G(P\_j, ID\_j\_d)$, wherein $Hash\_G(\ )$ is a hash function from the elliptic-curve signature to itself;
generating the intermediate parameters $L\_j\_(m+1)$ and $R\_j\_(m+1)$ corresponding to the remitter comprises: calculating the intermediate parameters $L\_j\_(m+1)$ and $R\_j\_(m+1)$ based on a random number $a\_(m+1)$ selected from the number field $Z\_q$ in which the elliptic-curve signature is located, such that the intermediate parameter $L\_j\_(m+1)=a\_(m+1) \times G$ and the intermediate parameter $R\_j\_(m+1)=a\_(m+1) \times Hash\_G(P''\_j)$;
generating the intermediate parameters $L\_i\_d$, $R\_i\_d$, $L\_i\_(m+1)$, and $R\_i\_(m+1)$ corresponding to the masked participant i comprises: generating the intermediate parameters $L\_i\_d$, $R\_i\_d$, $L\_i\_(m+1)$, and $R\_i\_(m+1)$ based on values of the intermediate parameters $L\_j\_d$ and $R\_j\_d$, so the intermediate parameter $L\_i\_d=(s\_i\_d \times G+c\_i \times P\_i) \mod p$, the intermediate parameter $R\_i\_d=(s\_i\_d \times Hash\_G(Pi, ID\_i\_d)+c\_i \times$ I_d) mod p, the intermediate parameter $L\_i\_(m+1)=[s\_i\_(m+1) \times G + c\_i \times P''\_i]$ mod p, the intermediate parameter $R\_i\_(m+1)=[s\_i\_(m+1) \times \text{Hash\_G}(P''\_i) + c\_i \times I\_(m+1)]$ mod p, $I\_d = x\_j \times \text{Hash\_G}(P\_j, ID\_j\_d)$, and $I\_(m+1) = r'' \times \text{Hash\_G}(P''\_j)$, wherein $s\_i\_1 - s\_i\_(m+1)$ are random numbers in the number field $Z\_q$; when i=1, $c\_1=\text{Hash}(M, L\_n\_1, R\_n\_1, \ldots, L\_n\_(m+1), R\_n\_(m+1))$; and when $i \in [2, j-1] \cup [j+1, n]$, $c\_i=\text{Hash}(M, L\_(i-1)\_1, R\_(i-1)\_1, \ldots, L\_(i-1)\_(m+1), R\_(i-1)\_(m+1))$, wherein Hash( ) is a hash function from the elliptic-curve signature to the number field $Z\_q$; and the selected random number and/or the derived value of the random number comprise: the random numbers $s\_i\_1$ to $s\_i\_(m+1)$, a derived value $c\_1$, and derived values $s\_j\_1$ to $s\_j\_(m+1)$, wherein $s\_j\_d=(a\_d - c\_j \times x\_j)$ mod p and $s\_j\_(m+1)=[a\_(m+1) - c\_j \times r'']$ mod p; when a value of j is determined as one, $c\_j=\text{Hash}(M, L\_n\_1, R\_n\_1, \ldots, L\_n\_(m+1), R\_n\_(m+1))$; and when the value of j is determined to belong to [2, n], $c\_j=\text{Hash}(M, L\_(j-1)\_1, R\_(j-1)\ 1, \ldots, L\_(j-1)\_(m+1), R\_(j-1)\_(m+1))$.

23. The computer-implemented system of claim 13, wherein the operations comprise:

initiating an asset deletion request to the blockchain network to delete at least a portion of assets that the remitter has spent from the blockchain ledger.

\* \* \* \* \*